United States Patent
Lyu

(10) Patent No.: US 10,447,425 B2
(45) Date of Patent: Oct. 15, 2019

(54) METHOD AND APPARATUS FOR DETERMINING TRANSPORT BLOCK SIZE

(71) Applicant: HUAWEI TECHNOLOGIES CO.,LTD., Shenzhen, Guangdong (CN)

(72) Inventor: Yongxia Lyu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/172,850

(22) Filed: Oct. 28, 2018

(65) Prior Publication Data

US 2019/0068313 A1 Feb. 28, 2019

Related U.S. Application Data

(63) Continuation of application No. PCT/CN2018/091692, filed on Jun. 15, 2018.

(30) Foreign Application Priority Data

Jun. 16, 2017 (CN) .......................... 2017 1 0459621
Aug. 11, 2017 (CN) .......................... 2017 1 0686578

(51) Int. Cl.
*H04L 1/00* (2006.01)
*H04W 28/06* (2009.01)
(Continued)

(52) U.S. Cl.
CPC .......... *H04L 1/0007* (2013.01); *H04B 7/0626* (2013.01); *H04L 1/0003* (2013.01);
(Continued)

(58) Field of Classification Search
CPC ... H04L 1/0007; H04L 1/0009; H04L 1/0003; H04B 7/0626; H04W 28/06; H04W 28/20
See application file for complete search history.

(56) References Cited

U.S. PATENT DOCUMENTS 9,596,052 B2 * 3/2017 Pan .......................... H04L 1/00
2014/0301356 A1 * 10/2014 Wang .................... H04L 1/0003
370/330

(Continued)

FOREIGN PATENT DOCUMENTS

CN 103152754 A 6/2013
CN 103534969 A 1/2014
(Continued)

OTHER PUBLICATIONS

R1-1709093 Ericsson,"On MCS/transport Block Size Determination for PDSCH",3GPP TSG-RAN WG1 Meeting #89, Hangzhou, China, May 15-19, 2017,total 5 pages.
(Continued)

*Primary Examiner* — Christopher P Grey
(74) *Attorney, Agent, or Firm* — Huawei Technologies Co., Ltd.

(57) ABSTRACT

In the field of wireless communication technologies, method and apparatus for determining a transport block size (TBS) of a data channel are provided. In a communication network, a terminal device receives control information from a network device. The control information includes modulation indication information and resource information of the data channel. The terminal device determines a modulation order and a code rate according to the modulation indication information, and determines number of time-frequency resources according to the resource indication information of the data channel. The terminal device determines the TBS according to the modulation order, the code rate, and the number of time-frequency resources. Based on the determined TBS, the terminal device decodes the data channel carried on the time-frequency resources or sends the data channel on the time-frequency resources.

26 Claims, 3 Drawing Sheets

(51) Int. Cl.
*H04W 28/20* (2009.01)
*H04B 7/06* (2006.01)

(52) U.S. Cl.
CPC ........... *H04L 1/0009* (2013.01); *H04W 28/06* (2013.01); *H04W 28/20* (2013.01)

(56) References Cited

U.S. PATENT DOCUMENTS

| | | |
|---|---|---|
| 2015/0043526 A1 | 2/2015 | Wang |
| 2015/0063239 A1* | 3/2015 | Wong ................. H04L 1/0007 370/329 |
| 2015/0117396 A1* | 4/2015 | Wang ................. H04W 72/042 370/330 |
| 2015/0200746 A1 | 7/2015 | Pan et al. |
| 2015/0319776 A1 | 11/2015 | Seo et al. |
| 2015/0365181 A1* | 12/2015 | Nagata ............... H04L 27/2275 370/329 |
| 2016/0036618 A1* | 2/2016 | Einhaus ............... H04L 1/0003 370/329 |
| 2017/0231000 A1 | 8/2017 | Nagata et al. |
| 2019/0045390 A1* | 2/2019 | Davydov .......... H04W 28/0273 |

FOREIGN PATENT DOCUMENTS

| | | |
|---|---|---|
| CN | 103580788 A | 2/2014 |
| CN | 104038970 A | 9/2014 |
| CN | 104885543 A | 9/2015 |
| CN | 104956723 A | 9/2015 |
| CN | 105897373 A | 8/2016 |
| GB | 2477537 A | 8/2011 |

OTHER PUBLICATIONS

R1-1708624 Qualcomm Incorporated,"Discussion on TB size determination",3GPP TSG RAN WG1 #89,Hangzhou, China,May 15-19, 2017,total 3 pages.

3GPP TS 38.212 V0.0.0 (May 2017),3rd Generation Partnership Project;Technical Specification Group Radio Access Network;NR;Multiplexing and channel coding(Release 15),total 10 pages.

3GPP TS 38.211 V0.0.0 (May 2017), 3rd Generation Partnership Project;Technical Specification Group Radio Access Network;NR;Physical channels and modulation(Release 15),total 10 pages.

R1-1708521 Nokia et al.,"On resource allocation and TBS determination for PDSCH and CP-OFDM based PUSCH in NR",3GPP TSG RAN WG1#89,Hangzhou, China, May 15-19, 2017,total 4 pages.

Motorola Mobility,"On support of DL 256-QAM",3GPP TSG RAN WG1 Meeting #76 R1-140675, Prague, Czech Republic, Feb. 10th — 14th 2014,total 3 pages.

Ericsson:"On MCS/transport Black Size Determination far Pusch", 3GPP Draft; R1-1709096, vol. RAN WG1, No. Hangzhou, China; May 14, 2017, XP051274254, 6 pages.

CATT: "High-level design principles for CSI-RS enhancements", 3GPP Draft; R1-153932, vol. RAN WG1, No. Beijing, P.R. China; Aug. 23, 2015, XP051001362, 4 pages.

* cited by examiner

METHOD AND APPARATUS FOR DETERMINING TRANSPORT BLOCK SIZE

CROSS-REFERENCE TO RELATED APPLICATIONS

This application is a continuation of International Application No. PCT/CN2018/091692, filed on Jun. 15, 2018, which claims priority to Chinese Patent Application No. 201710459621.X, filed on Jun. 16, 2017, and Chinese Patent Application No. 201710686578.0, filed on Aug. 11, 2017. The disclosures of the aforementioned applications are hereby incorporated by reference in their entireties.

TECHNICAL FIELD

This application relates to the field of communication technologies, and in particular, to method and apparatus for determining a transport block size (TBS).

BACKGROUND

Fifth Generation (5G) wireless communication systems (also referred to as new radio (NR) wireless communication systems) are purpose-built to support improved system performance. The 5G communication systems support a plurality of service types, a plurality of deployment scenarios, and wider spectrum ranges. The 5G wireless communication systems need to support different requirements from services of different service types. Therefore, resource scheduling in the 5G systems needs to have greater flexibility, and determination of a transport block size (TBS) in the resource scheduling needs to be more flexible.

In existing fourth generation (4G) Long Term Evolution (LTE) systems, for example, the determination of a TBS on a data channel of a terminal device includes the following steps:

Step 1: The terminal device determines a modulation scheme (modulation order) and a TBS index (I_TBS) according to a modulation and coding scheme (MCS) index (I_MCS) and an MCS mapping table predefined in a protocol.

Step 2: The terminal device determines, according to resource allocation information indicated by a network device, number of physical resource blocks (number of PRB, N_PRB) allocated in frequency domain.

Step 3: The terminal device searches in a predefined TBS table for a corresponding TBS value based on parameters such as the I_TBS and the N_PRB, to determine the TBS carried on the data channel.

In LTE systems, a basic assumption for determining the TBS is that a basic time unit for resource scheduling is one subframe (i.e. 14 orthogonal frequency division multiplexing (OFDM) symbols), and that number of resource elements available to the data channel in each PRB is fixed, for example, 120 resource elements (RE). However, for the 5G wireless communication systems, flexibility of resource scheduling increases greatly, and number of resource elements available to the data channel in each PRB varies greatly. In addition, scheduling time ranges and frequency domain ranges to be supported by the 5G wireless communication systems are extremely large. Therefore, if still using a manner of determining the TBS on the data channel in the LTE systems, operations would not be flexible, and scalability would be poor.

SUMMARY

Embodiments of this application provide a method for determining a transport block size, and an apparatus, to improve flexibility of a manner of determining a transport block size.

According to a first aspect, a method for determining a transport block size is provided, and the method includes: receiving, by a terminal device, control information sent by a network device, where the control information includes indication information and resource information of a data channel; determining, by the terminal device, a modulation scheme and a code rate based on a first mapping relationship set and the indication information, and determining number of time-frequency resources based on the resource information of the data channel, where the first mapping relationship set includes a correspondence between the indication information and a combination of the modulation scheme and the code rate; determining, by the terminal device, a first transport block size (TBS) based on the modulation scheme, the code rate, and the number of time-frequency resources; and decoding, by the terminal device based on the first TBS, the data channel carried on the time-frequency resources, or sending, by the terminal device on the time-frequency resources, the data channel based on the first TBS.

According to a second aspect, a method for determining a transport block size is provided, and the method may include:

determining, by a network device, a modulation scheme and a code rate, and determining indication information based on a first mapping relationship set and a combination of the modulation scheme and the code rate, where the first mapping relationship set includes a correspondence between the indication information and the combination of the modulation scheme and the code rate;

sending, by the network device, control information to a terminal device, where the control information includes the indication information and resource information of a data channel, and the resource information is used to determine number of time-frequency resources;

determining, by the network device, a first transport block size (TBS) based on the modulation scheme, the code rate, and the number of time-frequency resources; and decoding, by the network device based on the first TBS, the data channel carried on the time-frequency resources, or sending, by the network device on the time-frequency resources, the data channel based on the first TBS.

In the embodiments of this application, the terminal device may determine the modulation scheme and the code rate from the first mapping relationship set based on the control information delivered by the network device, and may further determine the number of time-frequency resources based on the control information. The time-frequency resources are time-frequency resources for sending or receiving the data channel, to be specific, time-frequency resources actually occupied by the data channel. Further, the terminal device may determine the TBS on the data channel. In this way, the TBS determined based on the time-frequency resources actually occupied by the data channel more matches a target code rate of the data channel, thereby improving accuracy of the TBS. The target code rate herein is a code rate that the network device expects the data channel to reach, and the foregoing code rate is a code rate actually used by the data channel.

In addition, because the TBS is determined based on the modulation scheme, the code rate, and the number of time-frequency resources, a relatively accurate TBS can be determined in a same manner regardless of number of scheduled resources and regardless of number of other overhead resources in the scheduled resources. Therefore, the manner of determining a TBS is applicable to various scheduling scenarios, and the manner of determining a TBS is highly flexible and has good scalability.

Further, because the determined TBS is more accurate, number of time-frequency resources allocated to the terminal device is not extremely small, so that a retransmission possibility can be reduced when sending the data channel or receiving the data channel, and the number of time-frequency resources allocated to the terminal device is not excessively large either, thereby avoiding resource waste.

Optionally, the determining, by the terminal device or the network device, a first transport block size (TBS) based on the modulation scheme, the code rate, and the number of time-frequency resources includes:

determining, by the terminal device or the network device, the first TBS based on the modulation scheme, the code rate, the number of time-frequency resources, and number of transport layers, where the first TBS meets the following formula:

$$\text{First } TBS = 8 \times \left\lceil \frac{N \cdot v \cdot Q \cdot R}{8} \right\rceil,$$

where

N is the number of time-frequency resources, v is the number of transport layers that is supported by the data channel, Q is a modulation order corresponding to the modulation scheme, and R is the code rate.

N may be quantized with a large granularity, and $$N = K \times \left\lceil \frac{N\_TEMP}{K} \right\rceil,$$

K is a positive integer, where

N_TEMP may be number of time-frequency resources available to the data channel, N is quantized number of time-frequency resources available to the data channel, and N is used to calculate the first TBS and/or a second TBS. Details are not described below.

Optionally, the first TBS may be obtained by looking up a table based on the number N of time-frequency resources available to the data channel, the number v of transport layers that is supported by the data channel, and the modulation scheme.

Optionally, number L of bits carried on a unit resource may be obtained by looking up a table based on the modulation scheme and the number v of transport layers that is supported by the data channel, and further, the first TBS is obtained by multiplying the number L of bits carried on the unit resource and a ratio of the number N of time-frequency resources available to the data channel to number of resources included in the unit resource.

Optionally, number L of bits carried in single layer transmission may be obtained by looking up a table based on the number N of time-frequency resources available to the data channel and the modulation scheme, and further, the first TBS is obtained by multiplying the number L of bits carried in single layer transmission and the number v of transport layers that is supported by the data channel.

Optionally, number L of bits carried in single layer transmission on a unit resource may be obtained by looking up a table based on the modulation scheme, and further, the first TBS is obtained by multiplying the number L of bits carried in single layer transmission on the unit resource, a ratio of the number N of time-frequency resources available to the data channel to number of resources included in the unit resource, and the number v of transport layers that is supported by the data channel.

In the embodiments of this application, the TBS may be determined through calculation by using a formula with reference to parameters such as the modulation scheme, the code rate, the number of time-frequency resources, and the number of transport layers that is supported by the data channel, so that efficiency in determining the TBS is higher. Further, in this application, the TBS may be determined in other manners than a manner of looking up a table. Therefore, there is no need to design a TBS table, implementation complexity of determining the TBS is reduced, and applicability is better. Certainly, in the embodiments of this application, a corresponding TBS table may be designed based on the foregoing formula, but a value obtained by looking up the table meets the foregoing formula. In this way, accuracy of the TBS can also be improved.

Optionally, the terminal device or the network device may determine a second TBS based on the modulation scheme, the code rate, the number of time-frequency resources, and number of transport layers, and determine the first TBS based on the second TBS.

The first TBS meets the following condition: when the second TBS is greater than a first reference threshold, the first TBS is equal to the second TBS.

In the embodiments of this application, the second TBS is introduced before the final first TBS is determined.

Optionally, the terminal device or the network device may determine the second TBS based on the modulation scheme, the code rate, the number of time-frequency resources, and the number of transport layers; and the second TBS meets the following formula:

$$\text{Second } TBS = 8 \times \left\lceil \frac{N \cdot v \cdot Q \cdot R}{8} \right\rceil,$$

where

N is the number of time-frequency resources, v is the number of transport layers that is supported by the data channel, Q is a modulation order corresponding to the modulation scheme, and R is the code rate.

Optionally, the second TBS may be obtained by looking up a table based on number N of time-frequency resources available to the data channel, the number v of transport layers that is supported by the data channel, and the modulation scheme.

Optionally, number L of bits carried on a unit resource may be obtained by looking up a table based on the modulation scheme and the number v of transport layers that is supported by the data channel, and further, the second TBS is obtained by multiplying the number L of bits carried on the unit resource and a ratio of number N of time-frequency resources available to the data channel to number of resources included in the unit resource.

Optionally, number L of bits carried in single layer transmission may be obtained by looking up a table based on number N of time-frequency resources available to the data channel and the modulation scheme, and further, the second TBS is obtained by multiplying the number L of bits carried in single layer transmission and the number v of transport layers that is supported by the data channel.

Optionally, number L of bits carried in single layer transmission on a unit resource may be obtained by looking up a table based on the modulation scheme, and further, the second TBS is obtained by multiplying the number L of bits carried in single layer transmission on the unit resource, a ratio of number N of time-frequency resources available to the data channel to number of resources included in the unit resource, and the number v of transport layers that is supported by the data channel.

In the embodiments of this application, the terminal device or the network device obtains the second TBS based on parameters such as the modulation scheme, the code rate, the number of time-frequency resources, and the number of transport layers, and then compares the second TBS with the first reference threshold. If the second TBS is greater than the first reference threshold, the second TBS may be used as a finally required TBS, namely, the first TBS. Optionally, in the embodiments of this application, if the second TBS obtained through calculation is less than or equal to the first reference threshold, an element (a first element) in a first value set may be determined as a finally required TBS, namely, the first TBS.

In the embodiments of this application, according to a manner of determining the first TBS by comparing the second TBS with the first reference threshold, transmission of a small data packet (or referred to as a small-sized packet), especially transmission of a special data packet, is more efficient, and a manner of determining a TBS when a large data packet is transmitted is more flexible, more applicable, and with better scalability. The special data packet may include a Voice over Internet Protocol (VoIP) packet, a Medium Access Control (MAC) control element (CE) packet, an enhanced voice services (EVS) codec (EVS codec) packet, and the like.

Optionally, the first reference threshold is greater than or equal to a size of a maximum VoIP packet or a size of a maximum MAC CE packet.

Optionally, the first value set includes at least one of a size of a VoIP packet and/or a size of a MAC CE packet.

Optionally, the first value set includes at least one of the following values: 8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, and 536.

Optionally, the first element is an element that is in the first value set and that is less than or equal to the second TBS, and an absolute value of a difference between the element and the second TBS is the smallest; or the first element is an element that is in the first value set and that is greater than or equal to the second TBS, and an absolute value of a difference between the element and the second TBS is the smallest; or the first element is an element in the first value set, and an absolute value of a difference between the element and the second TBS is the smallest.

In the embodiments of this application, a value set is defined based on the size of the VoIP packet or the size of the MAC CE packet. An element included in the value set may be the size of the VoIP packet, or may be the size of the MAC CE packet. Optionally, in the embodiments of this application, some values may be directly provided, and these values are represented by using an array or a set, to obtain a value set. The data may be a size of an existing VoIP packet or a size of an existing MAC CE packet, or may be a size of an extended VoIP packet or a size of an extended MAC CE packet, or may be some other inserted values than a value of the size of the VoIP packet and a value of the size of the MAC CE packet. In the embodiments of this application, the first reference threshold is set based on the size of the VoIP packet or the size of the MAC CE packet, and according to the determining manner of determining the first TBS by comparing the first reference threshold and the second TBS, transmission of the small-sized packet, especially transmission of the special data packet, is more efficient, and the manner of determining a TBS when a large packet is transmitted is more flexible and more applicable. If the second TBS is less than or equal to the size of the maximum VoIP packet or the size of the maximum MAC CE packet, an element in the first value set may be selected as the first TBS, so that transmission of the small-sized packet, especially transmission of the special data packet, is more efficient. If the second TBS is greater than the size of the maximum VoIP packet or the size of the maximum MAC CE packet, the second TBS is determined as the first TBS, so that the manner of determining a TBS when a large packet is transmitted is more flexible, more applicable, and with better scalability.

Optionally, the terminal device or the network device may determine a second TBS based on the modulation scheme, the code rate, the number of time-frequency resources, and number of transport layers, and determine the first TBS based on the second TBS.

The first TBS meets the following condition:

when an absolute value of a difference between the second TBS and a second element in a first value set is less than or equal to a second reference threshold, the first TBS is the second element in the first value set.

Alternatively, feasibly, when an absolute value of a difference between the second TBS and a second element in a first value set is greater than a second reference threshold, the first TBS is equal to the second TBS.

Optionally, the second reference threshold is a predefined value, or the second reference threshold is a product value of the second element and a predefined coefficient.

In the embodiments of this application, after the second TBS is obtained, differences between the second TBS and elements included in the first value set are calculated one by one, absolute values of the differences obtained through calculation are compared with the second reference threshold in sequence, and one element in the first value set is determined as the first TBS based on a comparison result. Optionally, in the embodiments of this application, it may be defined that a manner of determining the first TBS includes a manner 1 and a manner 2. In the manner 1, when the absolute value of the difference between the second TBS and the second element in the first value set is greater than the second reference threshold, the second TBS may be determined as the first TBS, so that a manner of determining a TBS when a large data packet is transmitted is more flexible, more applicable, and with better scalability. In the manner 2, an element (the second element) in the first value set is determined as the first TBS, where an absolute value of a difference between the element and the second TBS is less than or equal to the second reference threshold, so that transmission of a small data packet (or referred to as a small-sized packet), especially transmission of a special data packet, is more efficient.

Optionally, the resource information indicates time-frequency resources allocated by the network device to the terminal device, and the number of time-frequency resources is number of remaining time-frequency resources obtained after a specified time-frequency resource is subtracted from the time-frequency resources indicated by the resource information.

Correspondingly, the determining number of time-frequency resources based on the resource information of the data channel includes:

determining, by the terminal device, the number of time-frequency resources based on the resource information and the specified time-frequency resource, where the time-frequency resources include the remaining time-frequency resources obtained after the specified time-frequency resource is subtracted from the time-frequency resources indicated by the resource information.

The specified time-frequency resource may include one or more of a time-frequency resource occupied by a demodulation reference signal (DMRS) corresponding to the data channel, a time-frequency resource occupied by a channel state information-reference signal (CSI-RS) sent by the network device on the time-frequency resources indicated by the resource information, and a time-frequency resource reserved by the network device.

Optionally, the time-frequency resource reserved by the network device may include a time-frequency resource occupied by a signal or a channel preconfigured by the network device, for example, a time-frequency resource occupied by a primary synchronization signal (PSS), a secondary synchronization signal (SSS), a physical broadcast channel (PBCH), or the like.

In the embodiments of this application, the resource information of the data channel may be indicated by using the control information, and the terminal device determines, based on the time-frequency resources indicated by the resource information and a fixed overhead time-frequency resource, the time-frequency resources available to the data channel, so that a manner of determining the number of time-frequency resources available to the data channel is more flexible, and the determined number of time-frequency resources is more accurate, thereby improving accuracy of the determined TBS.

Optionally, the first mapping relationship set is a default mapping relationship set in a plurality of mapping relationship sets.

Alternatively, before the receiving, by a terminal device, control information sent by a network device, the method further includes: receiving, by the terminal device, configuration information sent by the network device. Alternatively, before the sending, by the network device, control information to a terminal device, the method further includes: sending, by the network device, configuration information to the terminal device. The configuration information indicates the first mapping relationship set, and the first mapping relationship set is one of a plurality of mapping relationship sets.

Optionally, one mapping relationship set may correspond to one table. Each mapping relationship set may include one or more combinations of modulation schemes and code rates, and each combination may correspond to one piece of indication information. Further, the indication information may be an index.

In the embodiments of this application, a plurality of mapping relationship sets may be configured or defined, and each mapping relationship set may be applicable to a service of the terminal device. In this way, the terminal device or the network device may select different mapping relationship tables based on different services, to better adapt to the service of the terminal device. It should be noted that the plurality of mapping relationship sets are not only related to services, but also may be related to other information. This is not limited in this application. In this way, when using a plurality of mapping relationship sets, the terminal device or the network device may determine a mapping relationship set based on other information, or select a default mapping relationship set.

Optionally, the control information further includes mapping relationship set indication information, the mapping relationship set indication information indicates the first mapping relationship set, and the first mapping relationship set is one of a plurality of mapping relationship sets.

Optionally, a format of the control information indicates the first mapping relationship set, and the first mapping relationship set is one of a plurality of mapping relationship sets.

Optionally, a type of information carried on the data channel indicated by the control information indicates the first mapping relationship set, and the first mapping relationship set is one of a plurality of mapping relationship sets.

In the embodiments of this application, a mapping relationship set applicable to the terminal device may be indicated by using the control information or the configuration information. This may dynamically adapt to a plurality of flexible resource allocation scenarios, and applicability is better.

Optionally, the control information includes precoding indication information, and the precoding indication information indicates the number of transport layers that is supported by the data channel. Correspondingly, before the determining, by the terminal device, a first transport block size (TBS) based on the modulation scheme, the code rate, and the number of time-frequency resources, the method further includes: determining, by the terminal device based on the precoding indication information included in the control information, the number of transport layers that is supported by the data channel.

Optionally, before the determining, by the terminal device, a first transport block size (TBS) based on the modulation scheme, the code rate, and the number of time-frequency resources, the method further includes:

determining, by the terminal device based on a transmission mode corresponding to the data channel, the number of transport layers that is supported by the data channel.

Correspondingly, before the determining, by the network device, a first transport block size (TBS) based on the modulation scheme, the code rate, and the number of time-frequency resources, the method further includes: determining, by the network device based on a transmission mode corresponding to the data channel, the number of transport layers that is supported by the data channel.

In the embodiments of this application, the number of transport layers that is supported by the data channel may be determined in a plurality of manners, and a manner of determining the number of transport layers that is supported by the data channel is more flexible. This may better adapt to various resource allocation scenarios.

According to a third aspect, a terminal device is provided, and the terminal device may include a transceiver unit and a processing unit. The transceiver unit and the processing unit may perform functions of the terminal device in the first aspect and the foregoing optional implementations.

According to a fourth aspect, a network device is provided, and the network device may include a transceiver unit and a processing unit. The transceiver unit and the processing unit may perform functions of the network device in the second aspect and the foregoing optional implementations.

According to a fifth aspect, a terminal device is provided, and the terminal device may include a processor, a memory, and a transceiver, where the memory and the transceiver are connected to the processor;

the memory is configured to store a group of program code; and the processor and the transceiver are configured to invoke the program code stored in the memory, to perform the method provided in the first aspect.

According to a sixth aspect, a network device is provided, and the network device may include a processor, a memory, and a transceiver, where the memory and the transceiver are connected to the processor;

the memory is configured to store a group of program code; and the processor and the transceiver are configured to invoke the program code stored in the memory, to perform the method provided in the second aspect.

According to a seventh aspect, a communications system is provided, and the system includes the terminal device provided in the third aspect and the network device provided in the fourth aspect.

According to an eighth aspect, a computer storage medium is provided, the computer storage medium is configured to store a computer software instruction used by the foregoing terminal device, and the computer software instruction includes a program designed to perform the foregoing aspects.

According to a ninth aspect, a computer storage medium is provided, the computer storage medium is configured to store a computer software instruction used by the foregoing network device, and the computer software instruction includes a program designed to perform the foregoing aspects.

According to a tenth aspect, a chip is provided, and the chip is coupled to a transceiver in a network device, to perform the technical solution in the second aspect of the embodiments of this application. It should be understood that "couple" in this embodiment of this application indicates a direct connection or an indirect connection between two parts. The connection may be fixed or movable, and the connection may allow communication of a fluid, electricity, an electrical signal, or another type of signal between the two parts.

According to an eleventh aspect, a chip is provided, and the chip is coupled to a transceiver in a terminal device, to perform the technical solution in the first aspect of the embodiments of this application. It should be understood that "couple" in this embodiment of this application indicates a direct connection or an indirect combination between two parts. The connection may be fixed or movable, and the connection may allow communication of a fluid, electricity, an electrical signal, or another type of signal between the two parts.

DESCRIPTION OF EMBODIMENTS

The following describes the embodiments of this application with reference to the accompanying drawings.

The method and apparatus for determining a transport block size, that are provided in the embodiments of this application, may be applicable to an LTE system, a 5G communication system, or other wireless communication systems that use various radio access technologies. For example, the method and apparatus for determining a transport block size may be applicable to communication systems that use access technologies like Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). The following gives a description of the embodiments by using the 5G communication system as an example.

Figure 1:
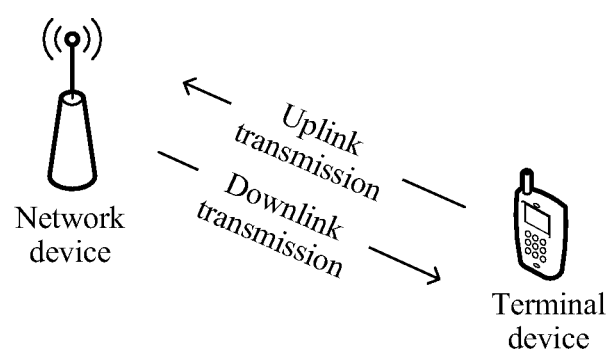
FIG. 1 is a schematic architectural diagram of a communication system.

FIG. 1 shows a basic architecture of a communication system. The communication system may include a network device, a terminal device, and the like. The network device and the terminal device may perform data or signaling transmission by using a wireless interface, and the transmission includes uplink transmission and downlink transmission.

The terminal device is a device that has wireless transmission/reception functions. The terminal device may be deployed on land as, for example, an indoor device, an outdoor device, a handheld device, or an in-vehicle device. The terminal device may also be deployed on the water (for example, on a ship), or may also be deployed in the air (for example, on a plane, a balloon, or a satellite). The terminal device may be a mobile phone, a tablet computer, a computer having a wireless transmission/reception functions, a virtual reality (VR) terminal device, or an augmented reality (AR) terminal device. The terminal device may be used as a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

For ease of description, in subsequent descriptions of the embodiments of this application, the devices mentioned above are collectively referred to as a terminal device.

The network device referred to in embodiments of this application is an apparatus that is deployed in a radio access network (RAN) and that is configured to provide wireless communication functions for the terminal device. The network device may be specifically a base station, and may be in various forms such as a macro base station, a micro base station, a relay node, an access point base station controller, a transmission reception point (TRP), and the like. The base station may have different specific names in systems that use different radio access technologies. For example, in an LTE network, the base station is referred to as an evolved NodeB (eNB), and in subsequent evolved systems, the base station may be referred to as a new radio nodeB or next generation nodeB (gNB). For ease of description, in subsequent descriptions of the embodiments of this application, the devices mentioned above are collectively referred to as a network device.

The 5G communication systems are purpose-built to support improved system performance. The 5G communication systems support a plurality of service types, different deployment scenarios, and wider spectrum ranges. The plurality of service types include enhanced mobile broadband (eMBB), massive machine type communication (mMTC), ultra-reliable and low latency communications (URLLC), multimedia broadcast multicast service (MBMS), positioning service, and the like. The different deployment scenarios may include indoor hotspot, dense urban area, suburbs, urban macro, and high-speed railway scenarios. The wider spectrum ranges means that the 5G wireless communication systems will support spectrum ranges up to 100 gigahertz (GHz), and the spectrum ranges include a low-frequency part of less than 6 GHz, and a high-frequency part ranging from 6 GHz to 100 GHz.

Compared with communication systems using the fourth generation (4G) mobile communication technologies, a feature of the 5G communication systems is the support for URLLC. URLLC includes a plurality of service types. Typical application cases include industrial control, automation of industrial production process, human-computer interaction, telemedicine, and the like. To better quantify performance indicators of a URLLC service, so as to provide reference inputs and evaluation criteria for a design of a 5G communication system, a RAN working group and a RAN1 working group of the 3rd Generation Partnership Project (3GPP) define performance indicators (including delay, reliability, system capacity, and the like) of the URLLC service as follows:

Delay: A delay is a transmission time for a user application layer data packet from a service data unit (SDU) of a radio protocol layer 2 and/or a radio protocol layer 3 at a transmit end to an SDU of a radio protocol layer 2 and/or a radio protocol layer 3 at a receive end. A user plane delay requirement of the URLLC service is 0.5 millisecond (ms) for both uplink and downlink transmissions. The delay requirement is only applicable to a scenario in which a network device and a terminal device are not in a discontinuous reception (DRX) state. The performance requirement of 0.5 ms is an average delay of the data packet, and is not bound to reliability requirement in the performance indicators of the URLLC service.

Reliability: Reliability is a success probability of correctly transmitting a certain amount (assumed to be X bits) of data within a specific transmission time (assumed to be L seconds) in a data transmission process from a transmit end to a receive end at a certain channel quality. The transmission time is still defined as a transmission time required for a user application layer data packet from an SDU of a radio protocol layer 2 and/or a radio protocol layer 3 at the transmit end to an SDU of a radio protocol layer 2 and/or a radio protocol layer 3 at the receive end. For the URLLC service, a typical requirement is to achieve reliability of 99.999% within 1 ms. It should be noted that the foregoing performance indicator is merely a typical value. In specific implementations, URLLC services in different application scenarios may have different reliability requirements. For example, in some extremely stringent industrial control services, it is required that a delay from a transmit end to a receive end is within 0.25 ms and that reliability of data transmission reaches 99.9999999%.

System capacity: A system capacity is a maximum throughput of a cell that the system can achieve on the premise of having a specific proportion of interrupted users. An interrupted user is a user whose reliability requirement the system cannot meet in a specific delay range. In other words, reliability that is required by some users in a specific delay range cannot be met by the system, and the users are referred to as interrupted users.

The 5G communication systems need to support requirements of different performance indicators of a plurality of services. Therefore, resource scheduling of the 5G communication systems need to be more flexible. A more flexible resource scheduling manner means a more flexible data transmission. Therefore, a manner of determining a transport block size (TBS) in data transmission also needs to be more flexible. The embodiments of this application provide a method and an apparatus for determining a TBS. The method and the apparatus allow for a more flexible resource scheduling manner, and meet requirements for more diversified service performance indicators.

With reference to FIG. 2 to FIG. 5, the following describes the method and the apparatus for determining a TBS according to the embodiments of this application.

Figure 2:
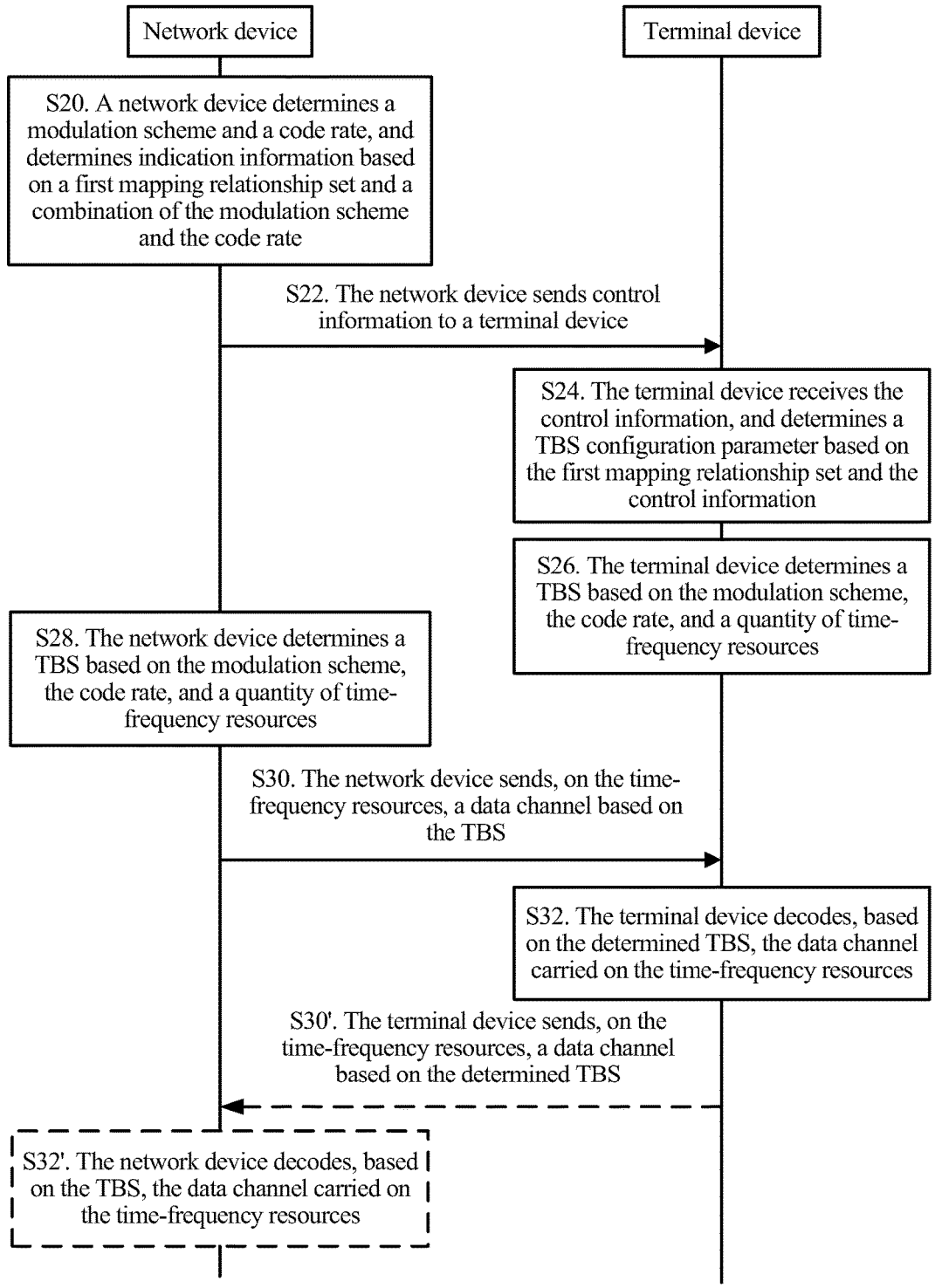
FIG. 2 is a schematic diagram of a method for determining a transport block size according to an embodiment of this application.

FIG. 2 is a schematic diagram of a method for determining a TBS according to an embodiment of this application. The method provided in this embodiment of this application includes the following steps.

S20. A network device determines a modulation scheme and a code rate, and determines indication information based on a first mapping relationship set and a combination of the modulation scheme and the code rate.

In a 5G communication system, a terminal device may support one or more services, for example, a URLLC service, an eMBB service, and an mMTC service.

In a specific implementation, one service supported by the terminal device may correspond to one mapping relationship set. A typical mapping relationship set may be represented as one table such as the following Table 1 or Table 2. Table 1 is a schematic table of a mapping relationship set of a modulation scheme and a code rate. For ease of description, the mapping relationship set shown in Table 1 may be set to a mapping relationship set 1 in a subsequent description of this embodiment of this application. Table 2 is another schematic table of a mapping relationship set of a modulation scheme and a code rate. For ease of description, the mapping relationship set shown in Table 2 may be set to a mapping relationship set 2 in a subsequent description of this embodiment of this application.

Optionally, each mapping relationship set may include one or more combinations of modulation schemes and code rates, and each combination may correspond to one piece of indication information. For example, combinations of modulation schemes and code rates in Table 1 include a combination (set to a combination 1) of a modulation scheme quadrature phase shift keying (QPSK) (corresponding to a modulation order 2) and a code rate 0.01, and indication information corresponding to the combination 1 is an MCS index that is equal to 0.

Optionally, the mapping relationship set may also be represented in other forms than a table, and may be specifically determined based on an actual application scenario requirement. This is not limited herein.

TABLE 1

| Modulation and Coding Scheme Index (MCS index) | Modulation scheme (which may be represented by a modulation order) | Code Rate |
| --- | --- | --- |
| 0 | 2 | 0.01 |
| 1 | 2 | 0.03 |
| 2 | 2 | 0.05 |
| 3 | 2 | 0.07 |
| 4 | 2 | 0.09 |
| 5 | 4 | 0.11 |
| 6 | 4 | 0.13 |
| 7 | 4 | 0.15 |

As shown in the foregoing Table 1, for the modulation schemes and the code rates shown in the mapping relationship set 1, there are eight combinations of the modulation schemes and the code rates of a data channel, and the modulation schemes include quadrature phase shift keying (QPSK) and 16 quadrature amplitude modulation (16QAM). One modulation scheme corresponds to one modulation order. Therefore, a correspondence between a modulation scheme and a code rate may be specifically represented by using a correspondence between a modulation order and a code rate. For example, a modulation order (denoted as Q or $Q_m$) of the modulation scheme QPSK is 2, and a modulation order of a modulation scheme 16QAM is 4. In a specific implementation, the modulation scheme may also be represented in another data form. This is not limited herein.

The code rates of the data channel are concentrated in a low code rate area, for example, a low code rate area ranging from 0.01 to 0.15. For example, because the URLLC service has performance requirements of high reliability and low delay, modulation schemes of the URLLC service are mainly lower-order modulation schemes, and code rates are mainly concentrated in a low code rate range. Therefore, the mapping relationship set 1 may be applicable to the URLLC service and the like supported by the terminal device. The URLLC service is merely an example. The mapping relationship set 1 may also be applicable to more types of services, and an applicable service type may be specifically determined based on an actual application scenario. This is not limited herein.

As shown in the foregoing Table 1, one combination of a modulation scheme and a code rate may correspond to one index. The index of the modulation scheme and the code rate may be an MCS index, or may be index information in another representation form. This is not limited herein. For ease of description, the following uses the MCS index to give a description, and details are not described in Table 2.

TABLE 2

| Modulation and Coding Scheme Index (MCS index) | Modulation Order | Code Rate |
| --- | --- | --- |
| 0 | 2 | 0.05 |
| 1 | 2 | 0.1 |
| 2 | 2 | 0.15 |
| 3 | 2 | 0.2 |
| 4 | 2 | 0.25 |
| 5 | 4 | 0.3 |
| 6 | 4 | 0.35 |
| 7 | 4 | 0.4 |
| 8 | 4 | 0.45 |
| 9 | 4 | 0.5 |
| 10 | 4 | 0.55 |
| 11 | 6 | 0.6 |
| 12 | 6 | 0.65 |
| 13 | 6 | 0.7 |
| 14 | 6 | 0.75 |
| 15 | 6 | 0.8 |

As shown in the foregoing Table 2, for modulation schemes and code rates shown in the mapping relationship set 2, there are 16 combinations of the modulation schemes and the code rates of a data channel. The modulation schemes include QPSK (a corresponding modulation order is 2, and to be specific, Q=2 or $Q_m$=2), 16QAM (a corresponding modulation order is 4, and to be specific, Q=4 or $Q_m$=4), and 64 quadrature amplitude modulation (64QAM) (a corresponding modulation order is 6, and to be specific, Q=6 or $Q_m$=6). The code rates cover a relatively large range, for example, a range ranging from 0.05 to 0.8. For example, because the eMBB service is characterized by a large amount of transmitted data, a high transmission rate, and the like in data transmission, the eMBB service has more modulation schemes, and code rates cover a larger range. Therefore, the mapping relationship set 2 may be applicable to the eMBB service and the like supported by the terminal device. The eMBB service is merely an example. The mapping relationship set 2 may also be applicable to more types of services, and an applicable service type may be specifically determined based on an actual application scenario. This is not limited herein.

Optionally, that the mapping relationship set described in this embodiment of this application includes the mapping relationship set 1 or the mapping relationship set 2 may be configured by the network device. The network device may configure different mapping relationship sets for the terminal device based on requirements of performance indicators of different services supported by the terminal device, to meet requirements of different performance indicators of different services of the terminal device. In specific implementation, if one terminal device supports only one service, the network device may configure one mapping relationship set for each of different terminal devices that support different services. In other words, the network device configures a plurality of mapping relationship sets for a plurality of terminal devices. In specific implementation, number of mapping relationship sets may be determined by the network device, or may be determined based on number of service types supported by the terminal device. This is not limited herein. The network device may configure different mapping relationship sets for different services, and further, may deliver, based on a service carried on the terminal device, indication information of a mapping relationship set corresponding to the service.

Optionally, that the mapping relationship set described in this embodiment of this application includes the mapping relationship set 1 or the mapping relationship set 2 may be preconfigured by the terminal device and does not need to be configured by the network device. Specifically, a definition manner of the mapping relationship set may be determined based on an actual application scenario. This is not limited herein.

In a specific implementation, the network device configures different mapping relationship sets for different services of the terminal device, or the terminal device pre-configures different mapping relationship sets for different services of the terminal device, to better adapt to the services of the terminal device. For example, because the URLLC service has performance requirements of high reliability and low delay, modulation schemes of the URLLC service are mainly lower-order modulation schemes, and code rates are mainly concentrated in a low code rate range. A mapping relationship set (for example, the mapping relationship set 1) of a modulation scheme and a code rate is specially defined for the URLLC service. On the one hand, a total number of combinations of the modulation scheme and the code rate can be reduced, so that overheads of downlink control information can be reduced when the terminal device is notified of the modulation scheme and the code rate. On the other hand, resolution in a low code rate working area can be improved, to better adapt to a channel, and improve spectrum efficiency of the system.

Optionally, the network device may configure a default mapping relationship set for the terminal device, or the terminal device pre-configures a default mapping relationship set. The default mapping relationship set is applicable to a requirement of a scenario of receiving a system broadcast message of the terminal device, for example, an application requirement of receiving a system message (system information), receiving a paging message, receiving a random access response, and the like. The default mapping relationship set is configured for the terminal device, so that a mapping relationship set required by a service of the terminal device is more complete, and service resource configuration of the terminal device is more flexible.

Optionally, in some feasible implementations, the network device may determine the modulation scheme and the code rate based on information such as a channel state or a to-be-scheduled resource. The network device may determine, from the first mapping relationship set based on the combination of the determined modulation scheme and code rate, the indication information corresponding to the combination of the modulation scheme and the code rate. The first mapping relationship set may be a default mapping relationship set in a plurality of mapping relationship sets. The indication information corresponding to the combination of the modulation scheme and the code rate may be index information such as an MCS index. Optionally, the first mapping relationship set may also be a mapping relationship set corresponding to a service supported by the terminal device. For example, the service supported by the terminal device is the URLLC service. After the network device determines the combination (set to the combination 1) of the modulation scheme QPSK (corresponding to the modulation order 2) and the code rate 0.01, the network device may determine, from the mapping relationship set 1 (Table 1), the indication information corresponding to the combination 1, that is, the MCS index is 0.

Optionally, the terminal device may report, to the network device, a service type supported by the terminal device. The network device may select, from a plurality of mapping relationship sets based on the service type supported by the terminal device, the first mapping relationship set that is applicable to the service type supported by the terminal device. To be specific, the first mapping relationship set is one of the plurality of mapping relationship sets. For example, if the terminal device reports that the service type supported by the terminal device is URLLC, the network device may use, as the first mapping relationship set, the mapping relationship set (the mapping relationship set 1) shown in Table 1. The network device may determine a combination of a modulation scheme and a code rate from the first mapping relationship set based on information such as a channel state or a to-be-scheduled resource. The network device then determines indication information corresponding to the combination of the modulation scheme and the code rate. For example, the network device determines the modulation scheme QPSK (corresponding to the modulation order 2) and the code rate 0.01 based on information such as the channel state and the to-be-scheduled resource. Further, the network device may determine, from Table 1, that the indication information of the combination of the modulation scheme and the code rate is the MCS index that is equal to 0.

S22. The network device sends control information to a terminal device.

The control information may be specifically downlink control information (DCI). The DCI may include the indication information of the modulation scheme and the code rate, resource information of a data channel, and the like. The indication information indicates an index of the modulation scheme and the code rate that are determined by the network device. The resource information is used to determine number of time-frequency resources.

The DCI sent by the network device to the terminal device may include mapping relationship set indication information. The mapping relationship set indication information is used to indicate the first mapping relationship set determined by the network device.

The DCI may include at least one bit that is used to indicate the first mapping relationship set. For example, a mapping relationship set of a modulation scheme and a code rate that are used by the data channel is indicated in the DCI by using one bit. When a value of the bit is "0", the mapping relationship set 1 (the mapping relationship set shown in Table 1) corresponds to the modulation scheme and the code rate that are used by the data channel. When the value of the bit is "1", the mapping relationship set 2 (the mapping relationship set shown in Table 2) corresponds to the modulation scheme and the code rate that are used by the data channel. The terminal device may determine the first mapping relationship set based on the value of the bit in the DCI.

Optionally, the network device delivers the DCI to the terminal device, and the terminal device may determine, based on a format of the DCI, a mapping relationship set of a modulation scheme and a code rate that are used by the data channel corresponding to the DCI. The format of the DCI corresponds to an original information bit included in the DCI. For example, a format 1 of the DCI corresponds to the mapping relationship set 1 of the modulation scheme and the code rate that are used by the data channel, and a format 2 of the DCI corresponds to the mapping relationship set 2 of the modulation scheme and the code rate that are used by the data channel. The terminal device may determine the first mapping relationship set based on the format of the DCI.

Optionally, the network device delivers the DCI to the terminal device, and the terminal device may determine, based on a type of information carried on the data channel, a mapping relationship set of a modulation scheme and a code rate that are used by the data channel corresponding to the DCI. For example, the terminal device may determine, by using the DCI, that the data channel carries a system message, and further, may determine the first mapping relationship set such as the default mapping relationship set of the modulation scheme and the code rate that are used by the data channel.

If the DCI sent by the network device does not include indication information of the first mapping relationship set, the terminal device may determine the default mapping relationship set as the first mapping relationship set.

Before sending the DCI to the terminal device, the network device may send configuration information to the terminal device, to indicate, by using the configuration information, the first mapping relationship set of the modulation scheme and the code rate that are used by the data channel corresponding to the DCI.

S24. The terminal device receives the control information, and determines a TBS configuration parameter based on the first mapping relationship set and the control information.

The TBS configuration parameter may include the modulation scheme, the code rate, and the number of time-frequency resources.

Specifically, after determining the first mapping relationship set, the terminal device may determine the modulation scheme and the code rate from the first mapping relationship set based on the indication information (for example, an MCS index) that is of the combination of the modulation scheme and the code rate and that is included in the DCI. For example, if the terminal device determines that the first mapping relationship set is the mapping relationship set 1 shown in Table 1, and the MCS index indicated by the indication information is 0, the terminal device may determine the modulation scheme and the code rate from Table 1. To be specific, the terminal device determines a modulation scheme 1 and the code rate 0.01 that are corresponding to the combination 1 of the modulation scheme and the code rate.

The DCI may include the resource information of the data channel. The resource information indicates time-frequency resources allocated by the network device to the terminal device. The terminal device may determine, based on the time-frequency resources that are allocated by the network device to the terminal device and that are indicated by the resource information and based on a fixed overhead time-frequency resource, the number of time-frequency resources occupied by the data channel. Specifically, the time-frequency resources occupied by the data channel may be time-frequency resources available to the data channel, and may specifically include remaining time-frequency resources obtained after the fixed overhead time-frequency resource (a specified time-frequency resource) is subtracted from the time-frequency resources allocated by the network device to the terminal device. The fixed overhead time-frequency resource may include a time-frequency resource occupied by a demodulation reference signal (DMRS) corresponding to the data channel, a time-frequency resource occupied by a channel state information-reference signal (CSI-RS) sent by the network device, a time-frequency resource reserved by the network device, and the like. The time-frequency resource reserved by the network device may include a time-frequency resource occupied by a signal or a channel preconfigured by the network device, for example, a time-frequency resource occupied by a primary synchronization signal (PSS), a secondary synchronization signal (SSS), a physical broadcast channel (PBCH), or the like. The time-frequency resource reserved by the network device may also include a reserved time-frequency resource and the like dynamically notified by the network device. Because the fixed overhead time-frequency resource may be in a unit of RE, the time-frequency resources occupied by the data channel may also be in a unit of RE. In other words, a size of the time-frequency resources occupied by the data channel may be less than a size of a physical resource block.

S26. The terminal device determines a TBS based on the modulation scheme, the code rate, and number of time-frequency resources.

In specific implementation, the TBS configuration parameter may further include number of transport layers that is supported by the data channel corresponding to the DCI.

The terminal device may determine, based on precoding indication information and the like included in the DCI, the number of transport layers that is supported by the data channel corresponding to the DCI.

The terminal device may determine, based on a transmission mode corresponding to the data channel corresponding to the DCI, the number of transport layers that is supported by the data channel.

Specifically, after determining the modulation scheme, the code rate, the number of time-frequency resources, and the number of transport layers that is supported by the data channel, the terminal device may determine the TBS on the data channel.

The TBS may be a first TBS.

Optionally, the first TBS meets the following formula:

$$\text{First } TBS = 8 \times \left\lceil \frac{N \cdot v \cdot Q \cdot R}{8} \right\rceil,$$

where

N is number of time-frequency resources available to the data channel, v is the number of transport layers that is supported by the data channel, Q is a modulation order corresponding to the determined modulation scheme, and R is the determined code rate.

N may be quantized with a large granularity, and $$N = K \times \left\lceil \frac{N\_TEMP}{K} \right\rceil,$$

K is a positive integer, where

N_TEMP may be the number of time-frequency resources available to the data channel, N is quantized number of time-frequency resources available to the data channel, and N is used to calculate the first TBS and/or a second TBS. Details are not described below.

The first TBS may be obtained by looking up a table based on the number N of time-frequency resources available to the data channel, the number v of transport layers that is supported by the data channel, and the modulation scheme.

Number L of bits carried on a unit resource may be obtained by looking up a table based on the modulation scheme and the number v of transport layers that is supported by the data channel, and further, the first TBS is obtained by multiplying the number L of bits carried on the unit resource and a ratio of the number N of time-frequency resources available to the data channel to number of resources included in the unit resource.

Number L of bits carried in single layer transmission may be obtained by looking up a table based on the number N of time-frequency resources available to the data channel and the modulation scheme, and further, the first TBS is obtained by multiplying the number L of bits carried in single layer transmission and the number v of transport layers that is supported by the data channel.

Number L of bits carried in single layer transmission on a unit resource may be obtained by looking up a table based on the modulation scheme, and further, the first TBS is obtained by multiplying the number L of bits carried in single layer transmission on the unit resource, a ratio of the number N of time-frequency resources available to the data channel to a number of resources included in the unit resource, and the number v of transport layers that is supported by the data channel.

In some feasible implementations, the terminal device may determine a second TBS based on parameters such as the modulation scheme, the code rate, the number of time-frequency resources, and the number of transport layers that is supported by the data channel, and then determine the first TBS based on the second TBS. The second TBS may be a temporary TBS determined by the terminal device, and the terminal device determines a finally required TBS, namely, the first TBS, based on the temporary TBS and another parameter.

The another parameter may be a size of a Voice over Internet Protocol (VoIP) packet and/or a size of a Medium Access Control (MAC) control element (CE) packet.

The second TBS may meet the following formula:

$$\text{Second } TBS = 8 \times \left\lceil \frac{N \cdot v \cdot Q \cdot R}{8} \right\rceil,$$

where

N is number of time-frequency resources available to the data channel, v is the number of transport layers that is supported by the data channel, Q is a modulation order corresponding to the determined modulation scheme, and R is the determined code rate.

N may be quantized with a large granularity, and $$N = K \times \left\lceil \frac{N\_TEMP}{K} \right\rceil,$$

K is a positive integer.

The second TBS may be obtained by looking up a table based on the number N of time-frequency resources available to the data channel, the number v of transport layers that is supported by the data channel, and the modulation scheme.

Number L of bits carried on a unit resource may be obtained by looking up a table based on the modulation scheme and the number v of transport layers that is supported by the data channel, and further, the second TBS is obtained by multiplying the number L of bits carried on the unit resource and a ratio of the number N of time-frequency resources available to the data channel to number of resources included in the unit resource.

Number L of bits carried in single layer transmission may be obtained by looking up a table based on the number N of time-frequency resources available to the data channel and the modulation scheme, and further, the second TBS is obtained by multiplying the number L of bits carried in single layer transmission and the number v of transport layers that is supported by the data channel.

Number L of bits carried in single layer transmission on a unit resource may be obtained by looking up a table based on the modulation scheme, and further, the second TBS is obtained by multiplying the number L of bits carried in single layer transmission on the unit resource, a ratio of the number N of time-frequency resources available to the data channel to number of resources included in the unit resource, and the number v of transport layers that is supported by the data channel.

The first TBS may be determined in any one of the following manners 1 to 4.

Manner 1:

If the second TBS is greater than a first reference threshold, the first TBS is equal to the second TBS. In other words, the second TBS may be determined as the first TBS, or the first TBS finally determined by the terminal device is equal to the second TBS.

Manner 2:

When the second TBS is less than or equal to a first reference threshold, the first TBS is a first element in a first value set.

When the second TBS is less than or equal to the first reference threshold, the first TBS may be an element that is in the first value set and that is less than or equal to the second TBS, and an absolute value of a difference between the element and the second TBS is the smallest.

If the second TBS is less than or equal to the reference threshold, the network device may sequentially calculate differences between the second TBS and elements included in the first value set, to obtain the differences between the second TBS and the elements included in the first value set. The network device may select an element that is in the first value set and that is less than or equal to the second TBS, where an absolute value of a difference between the element and the second TBS is the smallest. The network device determines the element as the first TBS. In this implementation, a value of the first TBS can preferentially ensure data transmission reliability, and a transmission efficiency loss is the smallest.

For example, assuming that the second TBS is equal to 48, and the first value set is [8, 16, 24, 32, 40, 56, 72, 104, 120, 144, 152, 176, 208, 224, 256, 296, 328, 344, 392, 440, 488, 536], it may be determined, by calculating differences between the second TBS and elements in the first value set, that an element 40 in the first value set is less than 48 and an absolute value of a difference between 40 and 48 is the smallest. Therefore, it may be determined that the first TBS is equal to 40.

For example, assuming that the second TBS is equal to 56, and the first value set is [8, 16, 24, 32, 40, 56, 72, 104, 120, 144, 152, 176, 208, 224, 256, 296, 328, 344, 392, 440, 488, 536], it may be determined, by calculating differences between the second TBS and elements in the first value set, that an element 56 in the first value set is equal to the second TBS (which is equal to 56). Therefore, it may be determined that the first TBS is equal to 56.

The first TBS may be an element that is in the first value set and that is greater than or equal to the second TBS, and an absolute value of a difference between the element and the second TBS is the smallest. In this implementation manner, a value of the first TBS can better meet a service quality requirement when data transmission reliability slightly decreases, and transmission efficiency is good.

For example, assuming that the second TBS is equal to 48, and the first value set is [8, 16, 24, 32, 40, 56, 72, 104, 120, 144, 152, 176, 208, 224, 256, 296, 328, 344, 392, 440, 488, 536], it may be determined that the first TBS is equal to 56.

For example, assuming that the second TBS is equal to 56, and the first value set is [8, 16, 24, 32, 40, 56, 72, 104, 120, 144, 152, 176, 208, 224, 256, 296, 328, 344, 392, 440, 488, 536], it may be determined that the first TBS is equal to 56.

Optionally, the first TBS is an element in the first value set, and an absolute value of a difference between the element and the second TBS is the smallest. If absolute values of differences between the second TBS and two elements are the same and are the smallest, a smaller element is selected. In this implementation, a value of the first TBS can minimize a deviation of data transmission reliability. Although transmission efficiency slightly decreases, data transmission reliability is improved.

Optionally, the first TBS is an element in the first value set, and an absolute value of a difference between the element and the second TBS is the smallest. If absolute values of differences between the second TBS and two elements are the same and are the smallest, a larger element is selected. In this implementation, a value of the first TBS can minimize a deviation of data transmission reliability. Although reliability slightly decreases, data transmission efficiency is improved.

For example, assuming that the second TBS is equal to 80, and the first value set is [8, 16, 24, 32, 40, 56, 72, 104, 120, 144, 152, 176, 208, 224, 256, 296, 328, 344, 392, 440, 488, 536], it may be determined that the first TBS is equal to 72.

For example, assuming that the second TBS is equal to 48, and the first value set is [8, 16, 24, 32, 40, 56, 72, 104, 120, 144, 152, 176, 208, 224, 256, 296, 328, 344, 392, 440, 488, 536], it may be determined that the first TBS is equal to 40.

Optionally, the first value set includes a size of a special data packet, for example, the size of the VoIP packet and/or the size of the MAC CE packet.

As shown in the following set 1 or set 2, the first value set may include only the size of the VoIP packet and/or the size of the MAC CE packet.

Set 1: [8, 16, 24, 32, 40, 56, 72, 104, 120, 144, 152, 176, 208, 224, 256, 296, 328, 344, 392, 440, 488, 536].

Set 2: [8, 16, 24, 32, 40, 48, 56, 64, 72, 104, 120, 144, 152, 176, 208, 224, 256, 296, 328, 344, 392, 440, 488, 536].

The first value set may also include a size of an enhanced voice services codec (EVS codec) packet.

For example, set 3: [8, 16, 24, 32, 40, 56, 72, 104, 120, 128, 144, 152, 176, 208, 216, 224, 232, 256, 264, 296, 328, 336, 344, 392, 416, 424, 440, 488, 512, 528, 536, 560, 632].

Set 4: [8, 16, 24, 32, 40, 48, 56, 64, 72, 104, 120, 128, 144, 152, 176, 208, 216, 224, 232, 256, 264, 296, 328, 336, 344, 392, 416, 424, 440, 488, 512, 528, 536, 560, 632].

As shown in the following set 5 or set 6, the first value set may include the size of the VoIP packet and/or the size of the MAC CE packet, and may include some elements inserted between elements with a relatively large difference in sizes of special data packets.

For example, set 5: [8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, 536].

Compared with the set 1, elements 88, 136, 280, 288, 336, 376, 408, 424, 456, 472, 504, and 520 in the set 5 are inserted elements. In this embodiment of this application, some elements are inserted between elements with a relatively large difference in the sizes of the special data packets (the size of the VoIP packet, the size of the MAC CE packet, the size of the EVS codec packet, and the like), so that differences between elements in the first value set are evener. The first TBS may be the size of the special data packet, or may be an inserted element, so that a value of the first TBS is more accurate and more applicable.

Set 6: [8, 16, 24, 32, 40, 48, 56, 64, 72, 88, 104, 120, 136, 144, 152, 176, 208, 224, 256, 280, 288, 296, 328, 336, 344, 376, 392, 408, 424, 440, 456, 472, 488, 504, 520, 536].

Compared with the set 2, elements 88, 136, 280, 288, 336, 376, 408, 424, 456, 472, 504, and 520 in the set 6 are inserted elements.

As shown in the following set 7 or set 8, the first value set may include the size of the VoIP packet, and/or the size of the MAC CE packet, and/or the size of the EVS codec packet, and may include some elements inserted between elements with a relatively large difference in sizes of special data packets.

Set 7: [8, 16, 24, 32, 40, 56, 72, 88, 104, 120, 128, 136, 144, 152, 176, 208, 216, 224, 232, 256, 264, 280, 296, 328, 336, 344, 392, 416, 424, 440, 456, 488, 512, 528, 536, 560, 632].

Set 8: [8, 16, 24, 32, 40, 48, 56, 64, 72, 88, 104, 120, 128, 144, 152, 176, 208, 216, 224, 232, 256, 264, 280, 296, 328, 336, 344, 392, 416, 424, 440, 488, 512, 528, 536, 560, 632].

The first reference threshold is greater than or equal to a size of a maximum VoIP packet or a size of a maximum MAC CE packet. A value of the first reference threshold may be 536, 328, or the like.

Further, the first reference threshold is greater than or equal to a size of a maximum VoIP packet, a size of a maximum MAC CE packet, or a size of a maximum EVS codec packet. A value of the first reference threshold may be 536, 328, 632, or the like.

In this embodiment of this application, according to a manner of determining the first TBS by comparing the second TBS with the first reference threshold, transmission of a small data packet (or referred to as a small-sized packet), especially transmission of a special data packet, is more efficient. A manner of determining a TBS when a large data packet is transmitted is more flexible, more applicable, and with better scalability. The special data packet may include the VoIP packet, the MAC CE packet, the EVS codec packet, and the like. This is not limited herein.

Manner 3:

When an absolute value of a difference between the second TBS and a second element in a first value set is less than or equal to a second reference threshold, the first TBS is the second element in the first value set.

After determining the second TBS, the terminal device may calculate differences between the second TBS and elements included in the first value set, and obtain absolute values of the differences between the second TBS and the elements in the first value set. If an absolute value of a difference between the second TBS and an element (set to the second element) in the first value set is less than or equal to the second reference threshold, the element may be determined as the first TBS.

A value of the second reference threshold may be a predefined value. The predefined value may be 8, 16, or 32. The predefined value may be agreed on in a protocol or configured by the network device.

A value of the second reference threshold may be a product value of the second element and a predefined coefficient, for example, M times the second element, where M may be a decimal. The predefined coefficient may be agreed on in a protocol or configured by the network device.

The predefined coefficient may be 0.01 or 0.1. Alternatively, the predefined coefficient may be set to different values for different second elements, and may be specifically determined based on an actual application scenario. For example, for a smaller second element, the predefined coefficient may be a relatively small value, for example, 0.01. For a larger second element, the predefined coefficient may be a relatively large value, for example, 0.05.

Manner 4:

When an absolute value of a difference between the second TBS and a second element in a first value set is greater than a second reference threshold, the second TBS is determined as the first TBS.

After determining the second TBS, the terminal device may calculate differences between the second TBS and elements included in the first value set, and obtain absolute values of the differences between the second TBS and the elements in the first value set. If an absolute value of a difference between the second TBS and an element (set to the second element) in the first value set is greater than the second reference threshold, the second TBS may be determined as the first TBS.

The terminal device may determine the first TBS in different manners. When the absolute value of the difference between the second TBS and the second element in the first value set is greater than the second reference threshold, the second TBS may be determined as the first TBS. Therefore, a manner of determining a TBS when a large data packet is transmitted is more flexible, more applicable, and with better scalability. When the absolute value of the difference between the second TBS and the second element in the first value set is less than or equal to the second reference threshold, an element (the second element) in the first value set may be determined as the first TBS. An absolute value of a difference between the element and the second TBS is less than or equal to the second reference threshold. Therefore, transmission of a small data packet (or referred to as a small-sized packet) especially transmission of a special data packet is more efficient.

S28. The network device determines a TBS based on the modulation scheme, the code rate, and number of time-frequency resources.

In a specific implementation, before determining the TBS on the data channel, the network device may determine, based on a transmission mode corresponding to the data channel, number of transport layers that is supported by the data channel.

The network device may determine the TBS based on the modulation scheme, the code rate, the number of time-frequency resources, and the number of transport layers that is supported by the data channel. The TBS may be a first TBS.

The first TBS meets the following formula:

$$\text{First } TBS = 8 \times \left\lceil \frac{N \cdot v \cdot Q \cdot R}{8} \right\rceil,$$

where

N is number of time-frequency resources available to the data channel, v is the number of transport layers that is supported by the data channel, Q is a modulation order corresponding to the determined modulation scheme, and R is the determined code rate.

Specifically, the data channel may be a data channel sent by the network device to the terminal device.

N may be quantized with a large granularity, and $$N = K \times \left\lceil \frac{N\_TEMP}{K} \right\rceil,$$

K is a positive integer.

In some feasible implementations, the network device may determine a second TBS based on parameters such as the modulation scheme, the code rate, the number of time-frequency resources, and the number of transport layers that is supported by the data channel, and then determine the first TBS based on the second TBS. The second TBS may be a temporary TBS determined by the network device, and the network device determines a finally required TBS, namely, the first TBS, based on the temporary TBS and another parameter.

The another parameter may be a size of a VoIP packet and/or a size of a MAC CE packet.

The second TBS may meet the following formula:

$$\text{Second } TBS = 8 \times \left\lceil \frac{N \cdot v \cdot Q \cdot R}{8} \right\rceil,$$

where

N is number of time-frequency resources available to the data channel, v is the number of transport layers that is supported by the data channel, Q is a modulation order corresponding to the determined modulation scheme, and R is the determined code rate.

The first TBS may be determined in any one of the following manners 1 to 4.

Manner 1:

If the second TBS is greater than a first reference threshold, the first TBS is equal to the second TBS. In other words, the second TBS may be determined as the first TBS, or the first TBS finally determined by the network device is equal to the second TBS.

Manner 2:

When the second TBS is less than or equal to a first reference threshold, the first TBS is a first element in a first value set.

When the second TBS is less than or equal to the first reference threshold, the first TBS may be an element that is in the first value set and that is less than or equal to the second TBS, and an absolute value of a difference between the element and the second TBS is the smallest.

If the second TBS is less than or equal to the reference threshold, the network device may sequentially calculate differences between the second TBS and elements included in the first value set, to obtain the differences between the second TBS and the elements included in the first value set. The network device may select an element from the first value set and that is less than or equal to the second TBS, where an absolute value of a difference between the element and the second TBS is the smallest; and determine the element as the first TBS.

For example, assuming that the second TBS is equal to 48, and the first value set is [8, 16, 24, 32, 40, 56, 72, 104, 120, 144, 152, 176, 208, 224, 256, 296, 328, 344, 392, 440, 488, 536], it may be determined, by calculating differences between the second TBS and elements in the first value set, that an element 40 in the first value set is less than 48 and an absolute value of a difference between 40 and 48 is the smallest. Therefore, it may be determined that the first TBS is equal to 40.

For example, assuming that the second TBS is equal to 56, and the first value set is [8, 16, 24, 32, 40, 56, 72, 104, 120, 144, 152, 176, 208, 224, 256, 296, 328, 344, 392, 440, 488, 536], it may be determined, by calculating differences between the second TBS and elements in the first value set, that an element 56 in the first value set is equal to the second TBS (which is equal to 56). Therefore, it may be determined that the first TBS is 56.

The first TBS may be an element that is in the first value set and that is greater than or equal to the second TBS, and an absolute value of a difference between the element and the second TBS is the smallest.

For example, assuming that the second TBS is equal to 48, and the first value set is [8, 16, 24, 32, 40, 56, 72, 104, 120, 144, 152, 176, 208, 224, 256, 296, 328, 344, 392, 440, 488, 536], it may be determined that the first TBS is equal to 56.

For example, assuming that the second TBS is equal to 56, and the first value set is [8, 16, 24, 32, 40, 56, 72, 104, 120, 144, 152, 176, 208, 224, 256, 296, 328, 344, 392, 440, 488, 536], it may be determined that the first TBS is equal to 56.

Optionally, the first TBS is an element in the first value set, and an absolute value of a difference between the element and the second TBS is the smallest. If absolute values of differences between the second TBS and two elements are the same and are the smallest, a smaller element is selected.

For example, assuming that the second TBS is equal to 80, and the first value set is [8, 16, 24, 32, 40, 56, 72, 104, 120, 144, 152, 176, 208, 224, 256, 296, 328, 344, 392, 440, 488, 536], it may be determined that the TBS is equal to 72.

For example, assuming that the second TBS is equal to 48, and the first value set is [8, 16, 24, 32, 40, 56, 72, 104, 120, 144, 152, 176, 208, 224, 256, 296, 328, 344, 392, 440, 488, 536], it may be determined that the TBS is equal to 40.

Optionally, the first value set includes a size of a special data packet, for example, the size of the VoIP packet and/or the size of the MAC CE packet.

Optionally, as shown in the following set 1 or set 2, the first value set may include only the size of the VoIP packet and/or the size of the MAC CE packet.

Set 1: [8, 16, 24, 32, 40, 56, 72, 104, 120, 144, 152, 176, 208, 224, 256, 296, 328, 344, 392, 440, 488, 536].

Set 2: [8, 16, 24, 32, 40, 48, 56, 64, 72, 104, 120, 144, 152, 176, 208, 224, 256, 296, 328, 344, 392, 440, 488, 536].

The first value set may also include a size of an EVS codec packet.

For example, set 3: [8, 16, 24, 32, 40, 56, 72, 104, 120, 128, 144, 152, 176, 208, 216, 224, 232, 256, 264, 296, 328, 336, 344, 392, 416, 424, 440, 488, 512, 528, 536, 560, 632].

Set 4: [8, 16, 24, 32, 40, 48, 56, 64, 72, 104, 120, 128, 144, 152, 176, 208, 216, 224, 232, 256, 264, 296, 328, 336, 344, 392, 416, 424, 440, 488, 512, 528, 536, 560, 632].

As shown in the following set 5 or set 6, the first value set may include the size of the VoIP packet and/or the size of the MAC CE packet, and may include some elements inserted between elements with a relatively large difference in sizes of special data packets.

Set 5: [8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, 536].

Compared with the set 1, elements 88, 136, 280, 288, 336, 376, 408, 424, 456, 472, 504, and 520 in the set 5 are inserted elements. In this embodiment of this application, some elements are inserted between elements with a relatively large difference in the sizes of the special data packets (the size of the VoIP packet, the size of the MAC CE packet, the size of the EVS codec packet, and the like), so that differences between elements in the first value set are evener. The first TBS may be the size of the special data packet, or may be an inserted element, so that a value of the first TBS is more accurate and more applicable.

Set 6: [8, 16, 24, 32, 40, 48, 56, 64, 72, 88, 104, 120, 136, 144, 152, 176, 208, 224, 256, 280, 288, 296, 328, 336, 344, 376, 392, 408, 424, 440, 456, 472, 488, 504, 520, 536].

Compared with the set 2, elements 88, 136, 280, 288, 336, 376, 408, 424, 456, 472, 504, and 520 in the set 6 are inserted elements.

As shown in the following set 7 or set 8, the first value set may include the size of the VoIP packet, and/or the size of the MAC CE packet, and/or the size of the EVS codec packet, and may include some elements inserted between elements with a relatively large difference in sizes of special data packets.

Set 7: [8, 16, 24, 32, 40, 56, 72, 88, 104, 120, 128, 136, 144, 152, 176, 208, 216, 224, 232, 256, 264, 280, 296, 328, 336, 344, 392, 416, 424, 440, 456, 488, 512, 528, 536, 560, 632].

Set 8: [8, 16, 24, 32, 40, 48, 56, 64, 72, 88, 104, 120, 128, 144, 152, 176, 208, 216, 224, 232, 256, 264, 280, 296, 328, 336, 344, 392, 416, 424, 440, 488, 512, 528, 536, 560, 632].

The first reference threshold is greater than or equal to a size of a maximum VoIP packet or a size of a maximum MAC CE packet. Optionally, a value of the first reference threshold may be 536, 328, or the like.

Further, the first reference threshold is greater than or equal to a size of a maximum VoIP packet, a size of a maximum MAC CE packet, or a size of a maximum EVS codes packet. Optionally, a value of the first reference threshold may be 536, 328, 632, or the like.

In this embodiment of this application, according to a manner of determining the first TBS by comparing the second TBS with the first reference threshold, transmission of a small data packet (or referred to as a small-sized packet) especially transmission of a special data packet is more efficient. Further, a manner of determining a TBS when a large data packet is transmitted is more flexible, more applicable, and with better scalability. The special data packet may include the VoIP packet, the MAC CE packet, the EVS codec packet, and the like. This is not limited herein.

Manner 3:

When an absolute value of a difference between the second TBS and a second element in a first value set is less than or equal to a second reference threshold, the first TBS is the second element in the first value set.

After determining the second TBS, the network device may calculate differences between the second TBS and elements included in the first value set, and obtain absolute values of the differences between the second TBS and the elements in the first value set. If an absolute value of a difference between the second TBS and an element (set to the second element) in the first value set is less than or equal to the second reference threshold, the element may be determined as the first TBS.

A value of the second reference threshold may be a predefined value. The predefined value may be 8, 16, or 32. The predefined value may be agreed on in a protocol or configured by the network device.

A value of the second reference threshold may be a product value of the second element and a predefined coefficient, for example, M times the second element, where M may be a decimal. The predefined coefficient may be agreed on in a protocol or configured by the network device.

The predefined coefficient may be 0.01 or 0.1. Alternatively, the predefined coefficient may be set to different values for different second elements, and may be specifically determined based on an actual application scenario. For example, for a smaller second element, the predefined coefficient may be a relatively small value, for example, 0.01. For a larger second element, the predefined coefficient may be a relatively large value, for example, 0.05.

Manner 4:

When an absolute value of a difference between the second TBS and a second element in a first value set is greater than a second reference threshold, the second TBS is determined as the first TBS.

After determining the second TBS, the network device may calculate differences between the second TBS and elements included in the first value set, and obtain absolute values of the differences between the second TBS and the elements in the first value set. If an absolute value of a difference between the second TBS and an element (set to the second element) in the first value set is greater than or equal to the second reference threshold, the second TBS may be determined as the first TBS.

The network device may determine the first TBS in different manners. When the absolute value of the difference between the second TBS and the second element in the first value set is greater than the second reference threshold, the second TBS may be determined as the first TBS. Therefore, a manner of determining a TBS when a large data packet is transmitted is more flexible, more applicable, and with better scalability. When the absolute value of the difference between the second TBS and the second element in the first value set is less than or equal to the second reference threshold, the element (the second element) in the first value set may be determined as the first TBS. An absolute value of a difference between the element and the second TBS is less than or equal to the second reference threshold. Therefore, transmission of a small data packet (or referred to as a small-sized packet), especially transmission of a special data packet, is more efficient.

An operation performed in step S28 may be performed before step S22. In other words, in a specific implementation, after determining the modulation scheme and the code rate, the network device may further determine the number of time-frequency resources and the number of transport layers that is supported by the data channel, and determine the first TBS based on the determined modulation scheme, code rate, number of time-frequency resources, and number of transport layers. A sequence of determining the first TBS and delivering the control information is not limited, and may be specifically determined based on an actual application scenario.

S30. The network device sends, on the time-frequency resources, a data channel based on a first TBS.

In specific implementation, for downlink data transmission, the network device may send, on the time-frequency resources, the data channel based on the determined first TBS. The time-frequency resources may be time-frequency resources actually occupied by the data channel.

S32. The terminal device decodes, based on the determined first TBS, the data channel carried on the time-frequency resources.

In specific implementation, for downlink data receiving, the terminal device may decode, based on the determined first TBS, the data channel carried on the time-frequency resources. The time-frequency resources may be time-frequency resources actually occupied by the data channel.

Steps S30 and S32 may also be replaced with the following optional steps S30' and S32'.

S30'. The terminal device sends, on the time-frequency resources, a data channel based on a determined first TBS.

S32'. The network device decodes, based on the first TBS, the data channel carried on the time-frequency resources.

For uplink data transmission, the network device sends the DCI to the terminal device, and the terminal device may perform channel coding and data modulation based on the determined modulation scheme and code rate. The terminal device may send, on the time-frequency resources actually occupied by the data channel, the data channel based on the determined first TBS.

For uplink data receiving, the network device may decode, based on the determined first TBS, the data channel carried on the time-frequency resources actually occupied by the data channel.

By comparing some feasible manners of determining the TBS on the data channel, it may be learned that the TBS meets the following formula:

$$TBS = 8 \times \left\lceil \frac{N_{PRE} \cdot M_{RE}^{DL,PRB} \cdot v \cdot Q_m \cdot R}{8} \right\rceil,$$

where $N_{PRB}$ indicates number of physical resource blocks (PRB) allocated by the network device to the terminal device, and $N_{PRB}$ is indicated by the DCI received by the terminal device. $N_{RB}^{DL,PRB}$ indicates number of time-frequency resources available to the data channel in each PRB, to be specific, remaining time-frequency resources obtained after a fixed overhead time-frequency resource is subtracted in each PRB. Each PRB has same $N_{RB}^{DL,PRB}$ that is semi-statically configured by the network device by using higher layer signaling; and v indicates the number of transport layers that is supported by the data channel, $Q_m$ indicates the modulation order, and R indicates a target code rate (the code rate) of the data channel. In an LTE system, $N_{RB}^{DL,PRB}$ is a fixed value (120). In the foregoing implementation, $N_{RB}^{DL,PRB}$ may be semi-statically configured by the network device, and a specific value of $N_{RB}^{DL,PRB}$ may be configured for different application scenarios.

However, in the 5G communication system, each PRB has different $N_{RB}^{DL,PRB}$. In the foregoing implementation, a configuration manner of $N_{RB}^{DL,PRB}$ is insufficiently flexible, cannot dynamically adapt to a specific application scenario, and as a result, cannot meet requirements of performance indicators of different services of the terminal device. Consequently, spectrum efficiency of the system is reduced. In the foregoing implementation, all services supported by the terminal device use a same mapping table of an MCS and a code rate. In other words, all the services use the same table of the code rate without distinction. Actually, different services have different requirements of performance indicators. For example, due to requirements of URLLC for a delay and reliability, a main working area of URLLC is a low code rate area. Therefore, the low code rate area is required to have a better granularity. In the foregoing implementation, MCSs used by all services are placed in one mapping table of an MCS and a code rate, and consequently, number of bits of the DCI may be increased, and applicability is poor.

In this embodiment of this application, the terminal device may determine the modulation scheme and the code rate from the first mapping relationship set based on the control information delivered by the network device, and may further determine the number of time-frequency resources based on the control information. The time-frequency resources are time-frequency resources for sending or receiving the data channel, to be specific, time-frequency resources actually occupied by the data channel. Further, the terminal device may determine the TBS on the data channel. In this way, the TBS determined based on the time-frequency resources actually occupied by the data channel more matches the target code rate of the data channel, thereby improving accuracy of the TBS. The target code rate herein is a code rate that the network device expects the data channel to reach, and the foregoing code rate is a code rate actually used by the data channel. The network device also determines the TBS based on the same number of time-frequency resources, and therefore, the TBS determined by the network device also has the foregoing effect.

In addition, because the TBS is determined based on the modulation scheme, the code rate, and the number of time-frequency resources, a relatively accurate TBS can be determined in a same manner regardless of number of scheduled resources and regardless of number of other overhead resources in the scheduled resources. Therefore, the manner of determining a TBS is applicable to various scheduling scenarios, and the manner of determining a TBS is highly flexible and has good scalability.

Further, because the determined TBS is more accurate, number of time-frequency resources allocated to the terminal device is not extremely small, so that a retransmission possibility can be reduced when sending the data channel or receiving the data channel, and the number of time-frequency resources allocated to the terminal device is not extremely large either, thereby avoiding resource waste.

In this embodiment of this application, different mapping relationship tables of modulation schemes and code rates may be configured for requirements of performance indicators of services of different service types of the terminal device. This can dynamically adapt to various flexible resource allocation scenarios in the 5G communication system, operations are more flexible, and applicability is better. Further, in the implementations provided in this embodiment of this application, a modulation scheme and a code rate may be directly determined based on a configured mapping relationship table of a modulation scheme and a code rate, and further, a TBS may be determined by using a predefined TBS determining formula without defining a TBS table and without operations of searching a plurality of tables such as an MCS mapping table and a TBS table, so that implementation complexity of determining a TBS is effectively reduced, data transmission efficiency and spectrum efficiency of the system are improved, and applicability is better.

Figure 3:
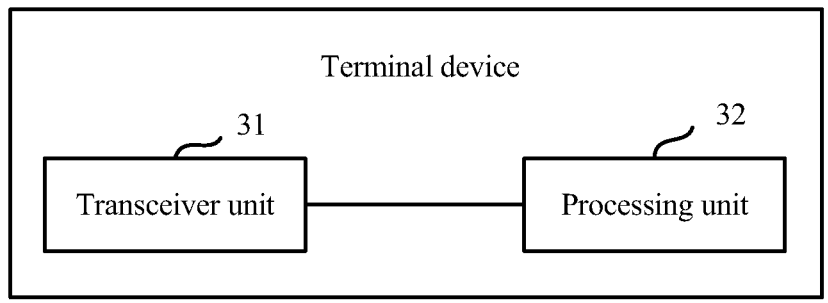
FIG. 3 is a schematic block diagram of a terminal device according to an embodiment of this application.

FIG. 3 is a schematic structural diagram of a terminal device according to an embodiment of this application. The terminal device shown in FIG. 3 may include a transceiver unit 31 and a processing unit 32. Each unit is described in detail below.

The transceiver unit 31 is configured to receive control information sent by a network device. The control information includes indication information and resource information of a data channel.

The processing unit 32 is configured to: determine a modulation scheme and a code rate based on a first mapping relationship set and the indication information received by the transceiver unit 31, and determine number of time-frequency resources based on the resource information that is of the data channel and that is received by the transceiver unit 31. The first mapping relationship set includes a correspondence between the indication information and a combination of the modulation scheme and the code rate.

The processing unit 32 is further configured to determine a first transport block size (TBS) based on the modulation scheme, the code rate, and the number of time-frequency resources.

The transceiver unit 31 is further configured to: decode, based on the first TBS determined by the processing unit 32, the data channel carried on the time-frequency resources, or send on the time-frequency resources, the data channel based on the first TBS determined by the processing unit 32.

Optionally, a size of the time-frequency resources is less than a size of a physical resource block.

Optionally, the processing unit 32 is configured to:
determine the first TBS based on the modulation scheme, the code rate, the number of time-frequency resources, and number of transport layers.

The first TBS meets the following formula:

$$\text{First } TBS = 8 \times \left\lceil \frac{N \cdot v \cdot Q \cdot R}{8} \right\rceil,$$

where
N is the number of time-frequency resources, v is the number of transport layers that is supported by the data channel, Q is a modulation order corresponding to the modulation scheme, and R is the code rate.

Optionally, the processing unit 32 is configured to:
determine a second TBS based on the modulation scheme, the code rate, the number of time-frequency resources, and number of transport layers; and determine the first TBS based on the second TBS.

The first TBS meets the following condition:
when the second TBS is greater than a first reference threshold, the first TBS is equal to the second TBS.

Optionally, the processing unit 32 is configured to:
determine a second TBS based on the modulation scheme, the code rate, the number of time-frequency resources, and number of transport layers; and determine the first TBS based on the second TBS.

The first TBS meets the following condition:
when the second TBS is less than or equal to a first reference threshold, the first TBS is a first element in a first value set.

Optionally, the processing unit 32 is configured to:
determine a second TBS based on the modulation scheme, the code rate, the number of time-frequency resources, and number of transport layers; and determine the first TBS based on the second TBS.

The first TBS meets the following condition:
when an absolute value of a difference between the second TBS and a second element in a first value set is less than or equal to a second reference threshold, the first TBS is the second element in the first value set.

Optionally, the processing unit 32 is configured to:
determine a second TBS based on the modulation scheme, the code rate, the number of time-frequency resources, and number of transport layers; and determine the first TBS based on the second TBS.

The first TBS meets the following condition:
when an absolute value of a difference between the second TBS and a second element in a first value set is greater than a second reference threshold, the first TBS is equal to the second TBS.

Optionally, the processing unit 32 is configured to:
determine the second TBS based on the modulation scheme, the code rate, the number of time-frequency resources, and the number of transport layers.

The second TBS meets the following formula:

$$\text{Second } TBS = 8 \times \left\lceil \frac{N \cdot v \cdot Q \cdot R}{8} \right\rceil,$$

where

N is the number of time-frequency resources, v is the number of transport layers that is supported by the data channel, Q is a modulation order corresponding to the modulation scheme, and R is the code rate.

Optionally, the first reference threshold is greater than or equal to a size of a maximum VoIP packet or a size of a maximum MAC CE packet.

Optionally, the first element is an element that is in the first value set and that is less than or equal to the second TBS, and an absolute value of a difference between the element and the second TBS is the smallest.

Alternatively, the first element is an element that is in the first value set and that is greater than or equal to the second TBS, and an absolute value of a difference between the element and the second TBS is the smallest.

Alternatively, the first element is an element in the first value set, and an absolute value of a difference between the element and the second TBS is the smallest.

Optionally, the first value set includes at least one of a size of a VoIP packet and/or a size of a MAC CE packet.

Optionally, the first value set includes at least one of the following values: 8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, and 536.

Optionally, the second reference threshold is a predefined value, or the second reference threshold is a product value of the second element and a predefined coefficient.

Optionally, the processing unit 32 is configured to:
determine the number of time-frequency resources based on the resource information received by the transceiver unit 31 and a specified time-frequency resource, where the time-frequency resources include remaining time-frequency resources obtained after the specified time-frequency resource is subtracted from time-frequency resources indicated by the resource information.

The specified time-frequency resource includes one or more of a time-frequency resource occupied by a demodulation reference signal (DMRS) corresponding to the data channel, a time-frequency resource occupied by a channel state information-reference signal (CSI-RS) sent by the network device on the time-frequency resources indicated by the resource information, and a time-frequency resource reserved by the network device.

Optionally, the first mapping relationship set is a default mapping relationship set in a plurality of mapping relationship sets.

Alternatively, the transceiver unit 31 is further configured to receive configuration information sent by the network device. The configuration information indicates the first mapping relationship set, and the first mapping relationship set is one of a plurality of mapping relationship sets.

Optionally, the control information further includes mapping relationship set indication information, the mapping relationship set indication information indicates the first mapping relationship set, and the first mapping relationship set is one of a plurality of mapping relationship sets.

Optionally, a format of the control information indicates the first mapping relationship set, and the first mapping relationship set is one of a plurality of mapping relationship sets.

Alternatively, a type of information carried on the data channel indicated by the control information indicates the first mapping relationship set, and the first mapping relationship set is one of a plurality of mapping relationship sets.

Optionally, the processing unit 32 is further configured to:
determine, based on precoding indication information included in the control information, the number of transport layers that is supported by the data channel.

Optionally, the processing unit 32 is further configured to:
determine, based on a transmission mode corresponding to the data channel, the number of transport layers that is supported by the data channel.

In specific implementation, the terminal device may execute, by using units in the terminal device, an implementation executed by the terminal device in the embodiment of FIG. 2. For a specific implementation, refer to corresponding descriptions in the method embodiment shown in FIG. 2. Details are not described herein again.

Figure 4:
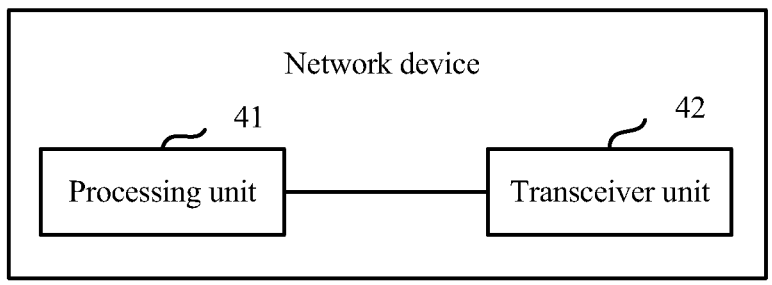
FIG. 4 is a schematic block diagram of a network device according to an embodiment of this application.

FIG. 4 is a schematic structural diagram of a network device according to an embodiment of this application. The network device shown in FIG. 4 may include a processing unit 41 and a transceiver unit 42. Each unit is described in detail below.

The processing unit 41 is configured to: determine a modulation scheme and a code rate, and determine indication information based on a first mapping relationship set and a combination of the modulation scheme and the code rate. The first mapping relationship set includes a correspondence between the indication information and the combination of the modulation scheme and the code rate.

The transceiver unit 42 is configured to send control information to a terminal device. The control information includes the indication information determined by the processing unit 41 and resource information of a data channel, and the resource information is used to determine number of time-frequency resources.

The processing unit 41 is further configured to determine a first transport block size (TBS) based on the modulation scheme, the code rate, and the number of time-frequency resources.

The transceiver unit 42 is further configured to: decode, based on the first TBS, the data channel carried on the time-frequency resources, or send on the time-frequency resources, the data channel based on the first TBS.

Optionally, a size of the time-frequency resources is less than a size of a physical resource block.

Optionally, the processing unit 41 is configured to:
determine the first TBS based on the modulation scheme, the code rate, the number of time-frequency resources, and number of transport layers.

The first TBS meets the following formula:

$$\text{First } TBS = 8 \times \left\lceil \frac{N \cdot v \cdot Q \cdot R}{8} \right\rceil,$$

where
N is the number of time-frequency resources, v is the number of transport layers that is supported by the data channel, Q is a modulation order corresponding to the modulation scheme, and R is the code rate.

Optionally, the processing unit 41 is configured to:
determine a second TBS based on the modulation scheme, the code rate, the number of time-frequency resources, and number of transport layers; and determine the first TBS based on the second TBS.

The first TBS meets the following condition:
when the second TBS is greater than a first reference threshold, the first TBS is equal to the second TBS.

Optionally, the processing unit 41 is configured to:

determine a second TBS based on the modulation scheme, the code rate, the number of time-frequency resources, and number of transport layers; and determine the first TBS based on the second TBS.

The first TBS meets the following condition:

when the second TBS is less than or equal to a first reference threshold, the first TBS is a first element in a first value set.

Optionally, the processing unit 41 is configured to:

determine a second TBS based on the modulation scheme, the code rate, the number of time-frequency resources, and number of transport layers; and determine the first TBS based on the second TBS.

The first TBS meets the following condition:

when an absolute value of a difference between the second TBS and a second element in a first value set is less than or equal to a second reference threshold, the first TBS is the second element in the first value set.

Optionally, the processing unit 41 is configured to:

determine a second TBS based on the modulation scheme, the code rate, the number of time-frequency resources, and number of transport layers; and determine the first TBS based on the second TBS.

The first TBS meets the following condition:

when an absolute value of a difference between the second TBS and a second element in a first value set is greater than a second reference threshold, the first TBS is equal to the second TBS.

Optionally, the processing unit 41 is configured to:

determine the second TBS based on the modulation scheme, the code rate, the number of time-frequency resources, and the number of transport layers.

The second TBS meets the following formula:

$$\text{Second } TBS = 8 \times \left\lceil \frac{N \cdot v \cdot Q \cdot R}{8} \right\rceil,$$

where

N is the number of time-frequency resources, v is the number of transport layers that is supported by the data channel, Q is a modulation order corresponding to the modulation scheme, and R is the code rate.

Optionally, the first reference threshold is greater than or equal to a size of a maximum VoIP packet or a size of a maximum MAC CE packet.

Optionally, the first element is an element that is in the first value set and that is less than or equal to the second TBS, and an absolute value of a difference between the element and the second TBS is the smallest.

Alternatively, the first element is an element that is in the first value set and that is greater than or equal to the second TBS, and an absolute value of a difference between the element and the second TBS is the smallest.

Alternatively, the first element is an element in the first value set, and an absolute value of a difference between the element and the second TBS is the smallest.

Optionally, the first value set includes at least one of a size of a VoIP packet and/or a size of a MAC CE packet.

Optionally, the first value set includes at least one of the following values: 8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, and 536.

Optionally, the second reference threshold is a predefined value, or the second reference threshold is a product value of the second element and a predefined coefficient.

Optionally, the resource information indicates time-frequency resources allocated by the network device to the terminal device.

The number of time-frequency resources is number of remaining time-frequency resources obtained after a specified time-frequency resource is subtracted from the time-frequency resources indicated by the resource information.

The specified time-frequency resource includes one or more of a time-frequency resource occupied by a demodulation reference signal (DMRS) corresponding to the data channel, a time-frequency resource occupied by a channel state information-reference signal (CSI-RS) sent by the network device, and a time-frequency resource reserved by the network device.

Optionally, the first mapping relationship set is a default mapping relationship set in a plurality of mapping relationship sets.

Alternatively, the transceiver unit 42 is further configured to send configuration information to the terminal device, where the configuration information indicates the first mapping relationship set, and the first mapping relationship set is one of a plurality of mapping relationship sets.

Optionally, the control information further includes mapping relationship set indication information, the mapping relationship set indication information indicates the first mapping relationship set, and the first mapping relationship set is one of a plurality of mapping relationship sets.

Optionally, a format of the control information indicates the first mapping relationship set, and the first mapping relationship set is one of a plurality of mapping relationship sets.

Alternatively, a type of information carried on the data channel indicated by the control information indicates the first mapping relationship set, and the first mapping relationship set is one of a plurality of mapping relationship sets.

Optionally, the control information includes precoding indication information, and the precoding indication information indicates the number of transport layers that is supported by the data channel.

Optionally, the processing unit 41 is further configured to:

determine, based on a transmission mode corresponding to the data channel, the number of transport layers that is supported by the data channel.

In specific implementation, the network device may execute, by using units in the network device, an implementation executed by the network device in the embodiment of FIG. 2. For a specific implementation, refer to corresponding descriptions in the method embodiment shown in FIG. 2. Details are not described herein again.

Figure 5:
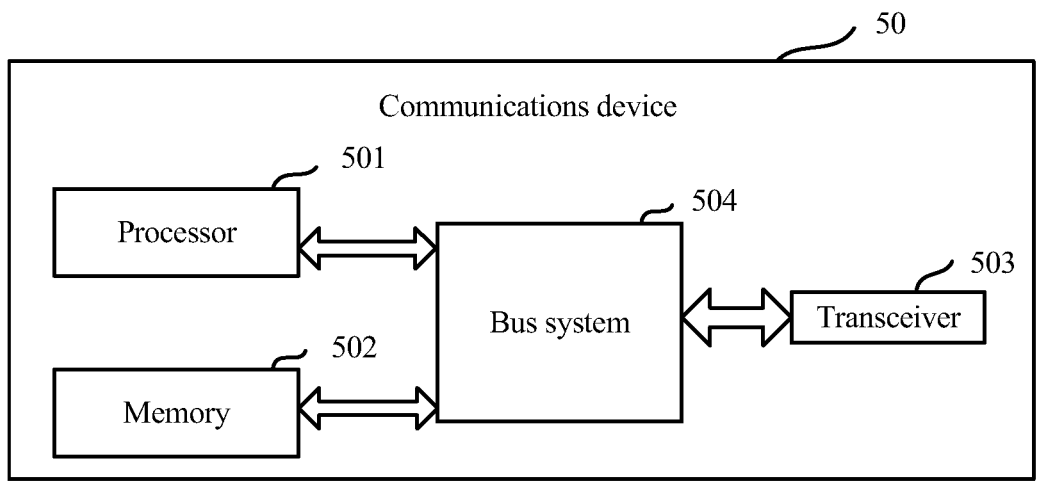
FIG. 5 is a schematic structural diagram of a communication device according to an embodiment of this application.

FIG. 5 is a schematic structural diagram of a communication device 50 according to an embodiment of this application. As shown in FIG. 5, the communication device 50 provided in this embodiment of this application includes a processor 501, a memory 502, a transceiver 503, and a bus system 504.

The processor 501, the memory 502, and the transceiver 503 are connected by using the bus system 504.

The memory 502 is configured to store a program. Specifically, the program may include program code, and the program code includes a computer operation instruction. The memory 502 includes but is not limited to a random access memory (RAM), a read-only memory (ROM), an erasable programmable read only memory (EPROM), or a compact disc read-only memory (CD-ROM). Only one memory is shown in FIG. 5. Certainly, a plurality of memories may be configured as required. The memory 502 may be a memory in the processor 501. This is not limited herein.

The memory 502 stores the following elements: an executable module or a data structure, or a subset thereof, or an extended set thereof:

an operation instruction, including various operation instructions and used for implementing various operations; and an operating system, including various system programs and used to implement various basic services and process a hardware-based task.

The processor 501 controls an operation of the communication device 50. The processor 501 may be one or more central processing units (CPU). When the processor 501 is one CPU, the CPU may be a single-core CPU, or may be a multi-core CPU.

In specific application, components of the communication device 50 are coupled together by using the bus system 504. In addition to a data bus, the bus system 504 may further include a power bus, a control bus, a status signal bus, and the like. However, for clear description, various types of buses in FIG. 5 are marked as the bus system 504. For ease of illustration, FIG. 5 merely shows an example of the bus system 504.

FIG. 3 provided in the embodiments of this application, or the method of the terminal device disclosed in the foregoing embodiments, or FIG. 4 provided in the embodiments of this application, or the method of the network device disclosed in the foregoing embodiments may be applied to the processor 501 or implemented by the processor 501. The processor 501 may be an integrated circuit chip and has a signal processing capability. In an implementation process, steps in the foregoing methods may be implemented by using a hardware integrated logical circuit in the processor 501, or by using instructions in a form of software. The processor 501 may be a general purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and implemented by using a hardware decoding processor, or may be performed and implemented by using a combination of hardware and software modules in the decoding processor. A software module may be located in a mature storage medium in the art, for example, a random access memory, a flash memory, a read-only memory, a programmable read only memory, an electrically erasable programmable memory, a register, or the like. The storage medium is located in the memory 502. The processor 501 reads information in the memory 502, and performs, in combination with hardware of the processor 501, the method steps of the terminal device described in FIG. 3 or the foregoing embodiments, or performs, in combination with hardware of the processor 501, the method steps of the network device described in FIG. 4 or the foregoing embodiments.

All or some of the processes of the methods in the embodiments may be implemented by a computer program instructing relevant hardware. The program may be stored in a computer readable storage medium. When the program runs, the processes of the method embodiments are performed. The foregoing storage medium includes any medium that can store program code, such as a ROM, a random access memory RAM, a magnetic disk, or an optical disc.

What is claimed is:

1. A method for determining a transport block size (TBS) of a data channel, comprising:
   receiving, by a terminal device, control information from a network device, wherein the control information comprises modulation indication information and resource information of the data channel;
   determining, by the terminal device, a modulation order and a code rate according to a mapping relationship set and the modulation indication information, wherein the mapping relationship set comprises a correspondence between the modulation indication information and a combination of the modulation order and the code rate;
   determining, by the terminal device, number of time-frequency resources according to the resource information; and
   determining, by the terminal device, the TBS according to the modulation order, the code rate, and the number of the time-frequency resources;
   wherein, according to the determined TBS, the terminal device decodes the data channel carried on the time-frequency resources or sends the data channel on the time-frequency resources; and
   wherein determining the TBS according to the modulation order, the code rate, and the number of time-frequency resources comprises:
   determining, by the terminal device, an intermediate TBS according to the modulation order, the code rate, the number of time-frequency resources, and number of transport layers; and
   determining, by the terminal device, the TBS according to the intermediate TBS;
   wherein when the intermediate TBS is less than or equal to a reference threshold, the TBS is determined to be an element value in a value set.

2. The method according to claim 1, wherein the value set comprises at least one of the following element values:
   8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, and 536.

3. The method according to claim 1, wherein determining the number of time-frequency resources according to the resource information comprises:
   determining, by the terminal device, the number of time-frequency resources to be the number of time-frequency resources indicated by the resource information subtracts number of specified time-frequency resources;
   wherein the specified time-frequency resources comprise one or more of:
   a time-frequency resource occupied by a demodulation reference signal (DMRS) corresponding to the data channel,
   a time-frequency resource occupied by a channel state information-reference signal (CSI-RS) from the network device on the time-frequency resources indicated by the resource information, and
   a time-frequency resource reserved by the network device.

4. The method according to claim 1, further comprising:
   before receiving the control information from the network device, receiving, by the terminal device, configuration information from the network device, wherein the configuration information comprises the mapping relationship set, and the mapping relationship set is one of a plurality of mapping relationship sets.

5. The method according to claim 1, wherein the modulation indication information comprises a modulation and coding scheme index (MCS index), wherein the mapping relationship set is a correspondence between the MCS index, the modulation order and the code rate.

6. The method according to claim 1, wherein the control information further comprises precoding indication information, and the method further comprises:
before determining the TBS according to the modulation order, the code rate, and the number of time-frequency resources, determining, by the terminal device according to the precoding indication information, number of transport layers supported by the data channel.

7. A method for sending or receiving a data channel, comprising:
determining, by a network device, a modulation order and a code rate of the data channel;
determining, by the network device, modulation indication information according to a mapping relationship set and a combination of the modulation order and the code rate, wherein the mapping relationship set comprises a correspondence between the modulation indication information and a combination of the modulation order and the code rate;
sending, by the network device, control information to a terminal device, wherein the control information comprises the modulation indication information and resource information of the data channel, and the resource information indicates number of time-frequency resources; and
determining, by the network device, a transport block size (TBS) according to the modulation order, the code rate, and the number of time-frequency resources;
wherein, according to the determined TB S, the network device decodes the data channel carried on the time-frequency resources or sends the data channel on the time-frequency resources; and
wherein determining the TBS according to the modulation order, the code rate, and the number of time-frequency resources comprises:
determining, by the network device, an intermediate TBS according to the modulation order, the code rate, the number of time-frequency resources, and number of transport layers; and
determining, by the network device, the TBS according to the intermediate TBS;
wherein when the intermediate TBS is less than or equal to a reference threshold, the TBS is determined to be an element value in a value set.

8. The method according to claim 7, wherein the control information instructs the terminal device to determine the TBS in transmitting or receiving the data channel on the time-frequency resources.

9. The method according to claim 7, wherein the value set comprises at least one of the following element values:
8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, and 536.

10. The method according to claim 7, wherein the resource information indicates time-frequency resources allocated by the network device to the terminal device; wherein the number of time-frequency resources is the number of time-frequency resources indicated by the resource information subtracts number of specified time-frequency resources; and wherein the specified time-frequency resources comprise one or more of:
a time-frequency resource occupied by a demodulation reference signal (DMRS) corresponding to the data channel,
a time-frequency resource occupied by a channel state information-reference signal (CSI-RS) from the network device, and
a time-frequency resource reserved by the network device.

11. The method according to claim 7, further comprising:
before sending the control information to the terminal device, sending, by the network device, configuration information to the terminal device, wherein the configuration information comprises the mapping relationship set, and the mapping relationship set is one of a plurality of mapping relationship sets.

12. The method according to claim 7, wherein the modulation indication information comprises a modulation and coding scheme index (MCS index), wherein the mapping relationship set is a correspondence between a MCS index, a modulation order and a code rate.

13. The method according to claim 7, wherein the control information further comprises precoding indication information, and the precoding indication information indicates the number of transport layers supported by the data channel.

14. A terminal device, comprising:
a transceiver and a processor;
wherein the transceiver is configured to:
receive control information from a network device, wherein the control information comprises modulation indication information and resource information of a data channel; and
the processor is configured to:
determine a modulation order and a code rate according to a mapping relationship set and the modulation indication information wherein the mapping relationship set comprises a correspondence between the modulation indication information and a combination of the modulation order and the code rate;
determine number of time-frequency resources according to the resource information; and
determine a transport block size (TBS) according to the modulation order, the code rate, and the number of time-frequency resources;
wherein, according to the determined TBS, the terminal device decodes the data channel carried on the time-frequency resources or sends the data channel on the time-frequency resources; and
wherein in determining the TBS according to the modulation order, the code rate, and the number of time-frequency resources, the processor is configured to:
determine an intermediate TBS according to the modulation order, the code rate, the number of time-frequency resources, and number of transport layers; and
determine the TBS according to the intermediate TBS, wherein when the intermediate TBS is less than or equal to a reference threshold, the TBS is determined to be an element value in a value set.

15. The terminal device according to claim 14, wherein the value set comprises at least one of the following element values:
8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, and 536.

16. The terminal device according to claim 14, wherein in determining the number of time-frequency resources according to the resource information, the processor is configured to:
determine the number of time-frequency resources to be the number of time-frequency resources indicated by the resource information subtracts number of specified time-frequency resources;
wherein the specified time-frequency resources comprise one or more of:
a time-frequency resource occupied by a demodulation reference signal (DMRS) corresponding to the data channel,
a time-frequency resource occupied by a channel state information-reference signal (CSI-RS) from the network device on the time-frequency resources indicated by the resource information, and
a time-frequency resource reserved by the network device.

17. The terminal device according to claim 14, wherein the transceiver is further configured to:
before receiving the control information from the network device, receive configuration information from the network device, wherein the configuration information comprises the mapping relationship set, and the mapping relationship set is one of a plurality of mapping relationship sets.

18. The terminal device according to claim 14, wherein the modulation indication information comprises a modulation and coding scheme index (MCS index), wherein the mapping relationship set is a correspondence between the MCS index, the modulation order and the code rate.

19. The terminal device according to claim 14, wherein the control information further comprises precoding indication information, and wherein the processor is further configured to:
before determining the TBS according to the modulation order, the code rate, and the number of time-frequency resources, determine, according to the precoding indication information, number of transport layers supported by the data channel.

20. A network device, comprising:
a processor and a transceiver;
wherein the processor is configured to:
determine a modulation order and a code rate of a date channel; and
determine modulation indication information according to a mapping relationship set and a combination of the modulation order and the code rate, wherein the mapping relationship set comprises a correspondence between the modulation indication information and a combination of the modulation order and the code rate;
the transceiver is configured to:
send control information to a terminal device, wherein the control information comprises the modulation indication information and resource information of the data channel, and the resource information indicates number of time-frequency resources;
the processor is further configured to:
determine a transport block size (TBS) according to the modulation order, the code rate, and the number of time-frequency resources;
wherein, according to the determined TB S, the network device decodes the data channel carried on the time-frequency resources or sends the data channel on the time-frequency resources; and
wherein in determining the TBS according to the modulation order, the code rate, and the number of time-frequency resources, the processor is configured to:
determine an intermediate TBS according to the modulation order, the code rate, the number of time-frequency resources, and number of transport layers; and
determine the TBS based on the intermediate TBS;
wherein when the intermediate TBS is less than or equal to a reference threshold, the TBS is determined to be an element value in a value set.

21. The network device according to claim 20, wherein the control information instructs the terminal device to determine a TBS in transmitting or receiving the data channel on the time-frequency resources.

22. The network device according to claim 21, wherein the value set comprises at least one of the following element values:
8, 16, 24, 32, 40, 56, 72, 88, 104, 120, 136, 144, 152, 176, 208, 224, 256, 280, 288, 296, 328, 336, 344, 376, 392, 408, 424, 440, 456, 472, 488, 504, 520, and 536.

23. The network device according to claim 20, wherein the resource information indicates time-frequency resources allocated by the network device to the terminal device;
wherein the number of time-frequency resources is the number of time-frequency resources indicated by the resource information subtracts number of specified time-frequency resources;
and wherein the specified time-frequency resources comprise one or more of:
a time-frequency resource occupied by a demodulation reference signal (DMRS) corresponding to the data channel,
a time-frequency resource occupied by a channel state information-reference signal (CSI-RS) from the network device, and
a time-frequency resource reserved by the network device.

24. The network device according to claim 20, wherein the transceiver is further configured to:
before sending the control information to the terminal device, send configuration information to the terminal device, wherein the configuration information comprises the mapping relationship set, and the mapping relationship set is one of a plurality of mapping relationship sets.

25. The network device according to claim 20, wherein the modulation indication information comprises a modulation and coding scheme index (MCS index), wherein the mapping relationship set is a correspondence between a MCS index, a modulation order and a code rate.

26. The network device according to claim 20, wherein the control information further comprises precoding indication information, and the precoding indication information indicates the number of transport layers supported by the data channel.

* * * * *